US011905114B2

(12) United States Patent
Kilibarda et al.

(10) Patent No.: US 11,905,114 B2
(45) Date of Patent: Feb. 20, 2024

(54) ASSEMBLY MATERIAL LOGISTICS SYSTEM AND METHODS

(71) Applicant: Comau LLC, Southfield, MI (US)

(72) Inventors: Velibor Kilibarda, Southfield, MI (US); Freddie Tappo, Sterling Heights, MI (US); William Frazer, Wixom, MI (US); Alessandro Puccioni, Solihull (GB)

(73) Assignee: Comau LLC, Southfield, MI (US)

( * ) Notice: Subject to any disclaimer, the term of this patent is extended or adjusted under 35 U.S.C. 154(b) by 36 days.

(21) Appl. No.: 17/340,509

(22) Filed: Jun. 7, 2021

(65) Prior Publication Data

US 2022/0009712 A1    Jan. 13, 2022

Related U.S. Application Data

(60) Provisional application No. 63/036,172, filed on Jun. 8, 2020.

(51) Int. Cl.
*B65G 1/04* (2006.01)
(52) U.S. Cl.
CPC .......... *B65G 1/0492* (2013.01); *B65G 1/0407* (2013.01); *B65G 2201/0294* (2013.01)
(58) Field of Classification Search
CPC ............... B65G 1/0492; B65G 1/0407; B65G 2201/0294
See application file for complete search history.

(56) References Cited

U.S. PATENT DOCUMENTS 2,493,005 A    1/1950 Williams
2,835,964 A    5/1958 Yarwood
(Continued)

FOREIGN PATENT DOCUMENTS

CA    2718907 A1    9/2009
CA    2663307 A1    11/2009
(Continued)

OTHER PUBLICATIONS

AGV Systems—Automatic Guided Vehicles, Intralogistics Division https://www.cassioli.com/intralogistics-division/automated-vehicles/agv-automatic-guided-vehicles/> accessed Jul. 6, 2022.
Ts 1 Transfer System; Bosch Rexroth AG, Sep. 25, 2018.
Flexible Transport System: Assembly Technology With High Degree of Freedom; Harro Hofliger; Sep. 25, 2018.
European Search Report dated Apr. 19, 2011 from the corresponding European Patent Application No. 11152656.2-2302.
(Continued)

*Primary Examiner* — Saul Rodriguez
*Assistant Examiner* — Ashley K Romano
(74) *Attorney, Agent, or Firm* — Young Basile Hanlon & MacFarlane, P.C.

(57) ABSTRACT

An assembly material logistics system and methods includes a marketplace component storage area and an assembly area each including an aligned rack aisle for the selected positioning of predetermined full containers and empty containers depleted of components. A plurality of transfer vehicles movable along a material aisle positioned directly adjacent to the rack aisle reciprocally move between the component storage and assembly areas to retrieve and deposit full and empty component storage containers to support assembly of at least one product in the assembly area. In one example, the component storage area includes a large component storage area, small component storage area and a consumable materials storage area. In an alternate example, the transfer vehicles include a first support and a second support to simultaneously support and transfer both a full component container and an empty component container leading to greater efficiency of material logistics.

23 Claims, 22 Drawing Sheets

(56) References Cited

U.S. PATENT DOCUMENTS

| | | |
|---|---|---|
| 3,444,802 A | 5/1969 | Barton |
| 3,854,889 A | 12/1974 | Lemelson |
| 4,032,018 A | 6/1977 | Wallis |
| 4,162,387 A | 7/1979 | De Candia |
| 4,232,370 A | 11/1980 | Tapley |
| 4,273,242 A | 6/1981 | Schaper |
| 4,328,422 A | 5/1982 | Loomer |
| 4,344,221 A | 8/1982 | Pagani |
| 4,369,563 A | 1/1983 | Williamson |
| 4,400,607 A | 8/1983 | Wakou et al. |
| 4,404,505 A | 9/1983 | Swanson et al. |
| 4,442,335 A | 4/1984 | Rossi |
| 4,456,810 A | 6/1984 | Schumacher et al. |
| 4,492,504 A | 1/1985 | Hainsworth |
| 4,530,056 A | 7/1985 | MacKinnon et al. |
| 4,600,136 A | 7/1986 | Sciaky et al. |
| 4,606,488 A | 8/1986 | Yanagisawa |
| 4,657,463 A | 4/1987 | Pipes |
| 4,659,895 A | 4/1987 | Di Rosa |
| 4,667,866 A | 5/1987 | Tobita et al. |
| 4,669,047 A * | 5/1987 | Chucta ............... G06Q 10/08 414/331.11 |
| 4,673,076 A | 6/1987 | Mattson |
| 4,679,297 A | 7/1987 | Hansen, Jr. et al. |
| 4,732,224 A | 3/1988 | Deeter et al. |
| 4,734,979 A | 4/1988 | Sakamoto et al. |
| 4,736,515 A | 4/1988 | Catena |
| 4,738,387 A | 4/1988 | Jaufmann et al. |
| 4,774,757 A | 10/1988 | Sakamoto et al. |
| 4,779,787 A | 10/1988 | Naruse et al. |
| 4,795,075 A | 1/1989 | Pigott et al. |
| 4,800,249 A | 1/1989 | Di Rosa |
| 4,815,190 A | 3/1989 | Haba, Jr. et al. |
| 4,872,419 A | 10/1989 | Blankemeyer et al. |
| 4,885,836 A | 12/1989 | Bonomi et al. |
| 4,896,014 A | 1/1990 | Sakai et al. |
| 4,928,383 A | 5/1990 | Kaczmarek et al. |
| 4,944,357 A | 7/1990 | Wible et al. |
| 4,967,947 A | 11/1990 | Sarh |
| 5,011,068 A | 4/1991 | Stoutenburg et al. |
| 5,086,908 A | 2/1992 | Gladish et al. |
| 5,091,855 A | 2/1992 | Umehara et al. |
| 5,123,148 A | 6/1992 | Ikeda et al. |
| 5,152,050 A | 10/1992 | Kaczmarek et al. |
| 5,177,862 A | 1/1993 | Speece |
| 5,199,156 A | 4/1993 | Rossi |
| 5,239,739 A | 8/1993 | Akeel et al. |
| 5,272,805 A | 12/1993 | Akeel et al. |
| 5,285,604 A | 2/1994 | Carlin |
| 5,301,411 A | 4/1994 | Fujiwara et al. |
| 5,319,840 A | 6/1994 | Yamamoto et al. |
| 5,347,700 A | 9/1994 | Tominaga et al. |
| 5,353,495 A | 10/1994 | Terabayashi et al. |
| 5,397,047 A | 3/1995 | Zampini |
| 5,400,944 A | 3/1995 | Zimmer et al. |
| 5,427,300 A | 6/1995 | Quagline |
| 5,433,783 A | 7/1995 | Ichinose et al. |
| 5,525,025 A | 6/1996 | Ootmar Ten Cate et al. |
| 5,531,830 A | 7/1996 | Ichinose et al. |
| 5,538,382 A | 7/1996 | Hasegawa et al. |
| 5,560,535 A | 10/1996 | Miller et al. |
| 5,577,593 A | 11/1996 | Hooper |
| 5,577,595 A | 11/1996 | Pollock et al. |
| 5,697,752 A | 12/1997 | Dugas et al. |
| 5,779,609 A | 7/1998 | Cullen et al. |
| 5,853,215 A | 12/1998 | Lowery |
| 5,864,991 A | 2/1999 | Burns |
| 5,882,174 A | 3/1999 | Woerner et al. |
| 5,896,637 A | 4/1999 | Sarh |
| 5,902,496 A | 5/1999 | Alborante |
| 5,940,961 A | 8/1999 | Parete |
| 5,943,768 A | 8/1999 | Ray |
| 6,008,471 A | 12/1999 | Alborante |
| 6,059,169 A | 5/2000 | Nihei et al. |
| 6,065,200 A | 5/2000 | Negre |
| 6,098,268 A | 8/2000 | Negre et al. |
| 6,132,509 A | 10/2000 | Kuschnereit |
| 6,138,889 A | 10/2000 | Campani et al. |
| 6,142,725 A | 11/2000 | Crorey |
| 6,170,732 B1 | 1/2001 | Vogt et al. |
| 6,193,142 B1 | 2/2001 | Segawa et al. |
| 6,250,533 B1 | 6/2001 | Otterbein et al. |
| 6,253,504 B1 | 7/2001 | Cohen et al. |
| 6,324,880 B1 | 12/2001 | Nakamura |
| 6,325,435 B1 | 12/2001 | Dubuc |
| 6,336,582 B1 | 1/2002 | Kato et al. |
| 6,349,237 B1 | 2/2002 | Koren et al. |
| 6,457,231 B1 | 10/2002 | Carter et al. |
| 6,467,675 B1 | 10/2002 | Ozaku et al. |
| 6,513,231 B1 | 2/2003 | Hafenrichter et al. |
| 6,516,234 B2 | 2/2003 | Kamiguchi et al. |
| 6,557,690 B2 | 5/2003 | Oldford et al. |
| 6,564,440 B2 | 5/2003 | Oldford et al. |
| 6,627,016 B2 | 9/2003 | Abare et al. |
| 6,634,097 B1 | 10/2003 | Ikeda |
| 6,651,392 B2 | 11/2003 | Ritzal |
| 6,688,048 B2 | 2/2004 | Staschik |
| 6,705,001 B2 | 3/2004 | How et al. |
| 6,705,523 B1 | 3/2004 | Stamm et al. |
| 6,712,230 B2 | 3/2004 | Lopez Alba |
| 6,719,122 B2 | 4/2004 | Oldford et al. |
| 6,744,436 B1 | 6/2004 | Chirieleison, Jr. et al. |
| 6,799,672 B2 | 10/2004 | Wood |
| 6,799,673 B2 | 10/2004 | Kilabarda |
| 6,801,821 B2 | 10/2004 | Madden et al. |
| 6,813,539 B2 | 11/2004 | Morimoto et al. |
| 6,857,529 B2 | 2/2005 | Lopez Alba |
| 6,916,375 B2 | 7/2005 | Molnar et al. |
| 6,948,227 B2 | 9/2005 | Kilibarda et al. |
| 6,966,427 B2 | 11/2005 | Kilibarda |
| 6,990,715 B2 | 1/2006 | Liu et al. |
| 6,991,064 B2 | 1/2006 | Ehrenleitner |
| 7,076,865 B2 | 7/2006 | Morbitzer et al. |
| 7,108,189 B2 | 9/2006 | Kilibarda |
| 7,232,027 B2 | 6/2007 | Kilibarda |
| 7,331,439 B2 | 2/2008 | Degain et al. |
| 7,356,378 B1 | 4/2008 | Huang et al. |
| 7,357,376 B2 | 4/2008 | Assmann |
| 7,490,710 B1 | 2/2009 | Weskamp et al. |
| 7,546,942 B2 | 6/2009 | Monti et al. |
| 7,845,121 B2 | 12/2010 | Wobben |
| 7,946,030 B2 | 5/2011 | Tanaka et al. |
| 8,097,451 B2 | 1/2012 | Gaalswyk |
| 8,108,989 B2 | 1/2012 | Muhlenkamp et al. |
| 8,127,687 B2 | 3/2012 | Spangler et al. |
| 8,201,723 B2 | 6/2012 | Kilibarda |
| 8,229,586 B2 | 7/2012 | Wallace et al. |
| 8,250,743 B2 | 8/2012 | Habisreitinger |
| 8,308,048 B2 | 11/2012 | Kilibarda |
| 8,360,225 B2 | 1/2013 | Spangler et al. |
| 8,474,132 B2 | 7/2013 | Li et al. |
| 8,474,683 B2 | 7/2013 | Kilibarda |
| 8,527,153 B2 | 9/2013 | Doan |
| 8,561,780 B2 | 10/2013 | Albeck et al. |
| 8,713,780 B2 | 5/2014 | Kilibarda |
| 8,733,617 B2 | 5/2014 | Kilibarda |
| 8,789,269 B2 | 7/2014 | Kilibarda et al. |
| 8,869,370 B2 | 10/2014 | Kilibarda |
| 9,014,836 B2 | 4/2015 | Stone et al. |
| 9,132,873 B1 | 9/2015 | Laurence et al. |
| 9,513,625 B2 | 12/2016 | Kilibarda |
| 9,581,983 B2 | 2/2017 | Kilibarda et al. |
| 9,802,766 B2 | 10/2017 | Ookada et al. |
| 9,815,511 B2 | 11/2017 | Kilibarda et al. |
| 10,131,388 B2 | 11/2018 | Kilibarda |
| 10,384,873 B2 | 8/2019 | Kilibarda et al. |
| 11,420,853 B2 * | 8/2022 | Kilibarda ............... B66F 9/063 |
| 2002/0087226 A1 | 7/2002 | Boudreau |
| 2002/0103569 A1 | 8/2002 | Mazur |
| 2002/0129566 A1 | 9/2002 | Piccolo et al. |
| 2002/0135116 A1 | 9/2002 | Dugas et al. |
| 2002/0162209 A1 | 11/2002 | Hosono et al. |
| 2002/0166842 A1 | 11/2002 | Grebenisan |
| 2003/0037432 A1 | 2/2003 | McNamara |

(56) References Cited

U.S. PATENT DOCUMENTS

| | | |
|---|---|---|
| 2003/0057256 A1 | 3/2003 | Nakamura et al. |
| 2003/0085192 A1 | 5/2003 | Lopez Alba |
| 2003/0115746 A1 | 6/2003 | Saito et al. |
| 2003/0175429 A1 | 9/2003 | Molnar et al. |
| 2003/0188952 A1 | 10/2003 | Oldford et al. |
| 2003/0189085 A1 | 10/2003 | Kilibarda et al. |
| 2004/0002788 A1 | 1/2004 | Morimoto et al. |
| 2004/0020974 A1 | 2/2004 | Becker et al. |
| 2004/0055129 A1 | 3/2004 | Ghuman |
| 2004/0149692 A1 | 8/2004 | Masanori |
| 2004/0216983 A1 | 11/2004 | Oldford et al. |
| 2004/0221438 A1 | 11/2004 | Savoy et al. |
| 2004/0258513 A1 | 12/2004 | Cooke |
| 2005/0008469 A1 | 1/2005 | Jung |
| 2005/0025612 A1 | 2/2005 | Ehrenleitner |
| 2005/0035175 A1 | 2/2005 | Nakamura et al. |
| 2005/0044700 A1 | 3/2005 | Ghuman et al. |
| 2005/0120536 A1 | 6/2005 | Kilibarda et al. |
| 2005/0153075 A1 | 7/2005 | Molnar et al. |
| 2005/0189399 A1 | 9/2005 | Kilibarda |
| 2005/0230374 A1 | 10/2005 | Rapp et al. |
| 2005/0236461 A1 | 10/2005 | Kilibarda et al. |
| 2005/0269382 A1 | 12/2005 | Caputo et al. |
| 2006/0157533 A1 | 7/2006 | Onoue et al. |
| 2006/0231371 A1 | 10/2006 | Moliere et al. |
| 2006/0288577 A1 | 12/2006 | Bormuth |
| 2007/0087924 A1 | 4/2007 | Krosta et al. |
| 2007/0101567 A1 | 5/2007 | Suda et al. |
| 2007/0164009 A1 | 7/2007 | Hesse |
| 2007/0175869 A1 | 8/2007 | Auger et al. |
| 2007/0215579 A1 | 9/2007 | Auger |
| 2007/0258797 A1 | 11/2007 | Gordon et al. |
| 2008/0022609 A1 | 1/2008 | Franco et al. |
| 2008/0061110 A1 | 3/2008 | Monti et al. |
| 2008/0084013 A1 | 4/2008 | Kilibarda |
| 2008/0104815 A1 | 5/2008 | Kussmaul |
| 2008/0105733 A1 | 5/2008 | Monti et al. |
| 2008/0116247 A1 | 5/2008 | Kilibarda |
| 2008/0131255 A1 | 6/2008 | Hessler et al. |
| 2008/0148546 A1 | 6/2008 | Monti et al. |
| 2008/0178537 A1 | 7/2008 | Spangler et al. |
| 2008/0181753 A1 | 7/2008 | Bastian et al. |
| 2008/0223692 A1 | 9/2008 | Tanahashi |
| 2008/0274865 A1 | 11/2008 | Sturm |
| 2008/0295335 A1 | 12/2008 | Kilibarda et al. |
| 2009/0056116 A1 | 3/2009 | Presley et al. |
| 2009/0078741 A1 | 3/2009 | Sata et al. |
| 2009/0118858 A1 | 5/2009 | Wallace et al. |
| 2009/0191032 A1 | 7/2009 | Bogaczyk |
| 2009/0234488 A1 | 9/2009 | Kilibarda |
| 2009/0277747 A1 | 11/2009 | Spangler et al. |
| 2009/0277748 A1 | 11/2009 | Spangler et al. |
| 2009/0277754 A1 | 11/2009 | Spangler et al. |
| 2009/0277755 A1 | 11/2009 | Spangler et al. |
| 2009/0279992 A1 | 11/2009 | Spangler et al. |
| 2009/0285666 A1 | 11/2009 | Kilibarda |
| 2009/0300998 A1 | 12/2009 | Ablett |
| 2010/0136883 A1 | 6/2010 | Call et al. |
| 2010/0180711 A1 | 7/2010 | Kilibarda et al. |
| 2010/0241260 A1 | 9/2010 | Kilibarda et al. |
| 2010/0290870 A1 | 11/2010 | Ezure et al. |
| 2010/0301099 A1 | 12/2010 | Sata et al. |
| 2010/0326832 A1 | 12/2010 | Albeck et al. |
| 2011/0017132 A1 | 1/2011 | Robbin |
| 2011/0047788 A1 | 3/2011 | Immekus et al. |
| 2011/0047791 A1 | 3/2011 | Ferenczi et al. |
| 2011/0138601 A1 | 6/2011 | Kilibarda |
| 2011/0192007 A1 | 8/2011 | Kilibarda |
| 2011/0252719 A1 | 10/2011 | Wallance |
| 2011/0265301 A1 | 11/2011 | Kilibarda |
| 2011/0314665 A1 | 12/2011 | Kilibarda |
| 2012/0005968 A1 | 1/2012 | Patino |
| 2012/0216384 A1 | 8/2012 | Immekus |
| 2012/0222277 A1 | 9/2012 | Spangler et al. |
| 2012/0274000 A1 | 11/2012 | Gaiser |
| 2012/0304446 A1 | 12/2012 | Kilibarda |
| 2013/0026002 A1 | 1/2013 | Spangler |
| 2013/0035783 A1 | 2/2013 | Scheuerman et al. |
| 2013/0109291 A1 | 5/2013 | Holtz et al. |
| 2014/0217155 A1 | 8/2014 | Kilibarda |
| 2014/0224621 A1 | 8/2014 | Monti et al. |
| 2015/0128719 A1 | 5/2015 | Kilibarda |
| 2017/0320669 A1 | 11/2017 | Kilibarda et al. |
| 2017/0334696 A1* | 11/2017 | Otto ................. B66F 9/141 |
| 2017/0344009 A1 | 11/2017 | Wernersbach |
| 2018/0093728 A1 | 4/2018 | Mayr |
| 2019/0291951 A1* | 9/2019 | Iellimo ............ B66F 9/0755 |
| 2019/0291955 A1* | 9/2019 | Bastian, II ......... B65G 1/1373 |
| 2020/0122925 A1* | 4/2020 | Abou-Chakra ...... B65G 1/0492 |
| 2020/0172334 A1* | 6/2020 | Yamashita ............ B65G 1/065 |
| 2020/0198892 A1* | 6/2020 | Ahmann ............. B65G 1/1373 |
| 2020/0398916 A1 | 12/2020 | Finke |
| 2021/0047118 A1* | 2/2021 | Stevens .............. G06Q 10/087 |
| 2021/0171141 A1 | 6/2021 | Finke |
| 2021/0198038 A1* | 7/2021 | Enenkel ............. B65G 37/02 |
| 2021/0229915 A1* | 7/2021 | Plascinskas .......... B65G 47/244 |
| 2021/0253339 A1* | 8/2021 | Veenman ............. B65G 1/02 |
| 2021/0300678 A1* | 9/2021 | Van Buijtene .......... F16G 13/20 |

FOREIGN PATENT DOCUMENTS

| | | |
|---|---|---|
| CA | 2659143 A1 | 4/2010 |
| CA | 2904751 A1 | 4/2010 |
| CA | 2904752 A1 | 4/2010 |
| CA | 2786113 A1 | 7/2011 |
| CN | 101579792 A | 11/2009 |
| CN | 101722421 A | 6/2010 |
| CN | 102706746 A | 10/2012 |
| CN | 103649857 A | 3/2014 |
| DE | 19806963 A1 | 10/1998 |
| DE | 19736252 A1 | 3/1999 |
| DE | 20012052 U1 | 10/2000 |
| DE | 19940992 A1 | 3/2001 |
| DE | 102004057664 A1 | 6/2006 |
| DE | 102005062691 A1 | 7/2007 |
| DE | 202007005034 U1 | 8/2008 |
| DE | 202013004209 U1 | 7/2013 |
| DE | 102015000968 A1 | 4/2016 |
| EP | 201262 A1 | 11/1986 |
| EP | 0232999 A2 | 8/1987 |
| EP | 0261297 A1 | 3/1988 |
| EP | 0446518 A1 | 9/1991 |
| EP | 574779 A1 | 12/1993 |
| EP | 0673711 A1 | 9/1995 |
| EP | 0865869 A1 | 9/1998 |
| EP | 1298043 A2 | 4/2003 |
| EP | 1302415 A1 | 4/2003 |
| EP | 1310324 A1 | 5/2003 |
| EP | 1362663 A2 | 11/2003 |
| EP | 1403176 A2 | 3/2004 |
| EP | 1426275 A1 | 6/2004 |
| EP | 2082831 A1 | 7/2009 |
| EP | 2100804 A1 | 9/2009 |
| EP | 2119532 A1 | 11/2009 |
| EP | 2332689 A1 | 6/2011 |
| EP | 2505299 A1 | 10/2012 |
| EP | 2585656 A2 | 5/2013 |
| EP | 2715465 A1 | 4/2014 |
| FR | 3049481 A1 | 10/2017 |
| GB | 2231687 A | 11/1990 |
| GB | 2250723 A | 6/1992 |
| GB | 2271651 A | 4/1994 |
| JP | S6340683 A | 2/1988 |
| JP | S6413515 U | 1/1989 |
| JP | H06345397 A | 12/1994 |
| JP | H0740059 A | 2/1995 |
| JP | 10101222 | 4/1998 |
| JP | H11104848 A | 4/1999 |
| JP | 2005205431 A | 8/2005 |
| JP | 2011121089 A | 6/2011 |
| WO | 8603153 A1 | 6/1986 |
| WO | 0068117 A1 | 11/2000 |
| WO | 2006109246 A1 | 10/2006 |
| WO | 2007077056 A1 | 7/2007 |

(56) References Cited

FOREIGN PATENT DOCUMENTS

| WO | 2009131293 A1 | 10/2009 |
|---|---|---|
| WO | 2011053681 A1 | 5/2011 |
| WO | 2011085175 A2 | 7/2011 |
| WO | 2011162930 A1 | 12/2011 |
| WO | 2012166775 A1 | 12/2012 |
| WO | 2016100220 A1 | 6/2016 |

OTHER PUBLICATIONS

European Search Report dated Aug. 28, 2009 from the corresponding European Patent Application No. 09158794.9-2302.

International Preliminary Report of Patentability in corresponding application PCT/2014/064948, dated May 17, 2016.

International Search Report and Written Opinion of the International Searching Authority dated Oct. 9, 2012 from the corresponding International Application No. PCT/US2012/039952.

International Search Report and Written Opinion of the International Searching Authority dated Aug. 29, 2011 from the corresponding International Application No. PCT/US2011/039097.

FMC; Automated Fork lifts and Material Handling Lifts—Forked Automated Guided Vehicles; http://www.fmcsgvs.com/content/products/forked.sub.-vehicles.htm;p. 1., printed Mar. 26, 2008.

FMC; SGV (Self Guided Vehicles)—Automated Guided Vehicle Systems; http://www.fmcsgvs.com/content/products/sgv.htm, p. 1., printed Mar. 26, 2008.

FMC; Automated Material Handling Systems & Equipment for Material Movement: AGV Applications; http://www.fmcsgvs.com/content/sales/applications.htm; pp. 1-2., printed Mar. 26, 2008.

FMC; Layout Wizard AGV Configuration Software; http://fmcsgvs.com/content/products/wizard.htm; p. 1., printed Mar. 26, 2008.

FMC; Laser Navigation Controls; http://www.fmcsgvs.com/content/products/nav.htm; pp. 1-2., printed Mar. 26, 2008.

European Search Report dated Jul. 13, 2009 from the corresponding European Application No. 09151980.1-1523.

FMC; AGV System Controls; http://www.fmcsgvs.com/content/products/system.htm; p. 1., printed Mar. 26, 2008.

Mats Jackson and Abedullah Zaman, Factory-In-a-Box-Mobile Production Capacity of Demand, International Journal of Modern Engineering vol. 8, No. 1 Fall2007.

Notification of Transmittal, the International Search Report and the Written Opinion of the International Searching Authority dated Jan. 28, 2013, from the corresponding International Application No. PCT/US2011/020486 filed Jan. 7, 2011.

International Search Report in related matter PCT/US2015/065588, dated May 19, 2016, 25 pages.

\* cited by examiner

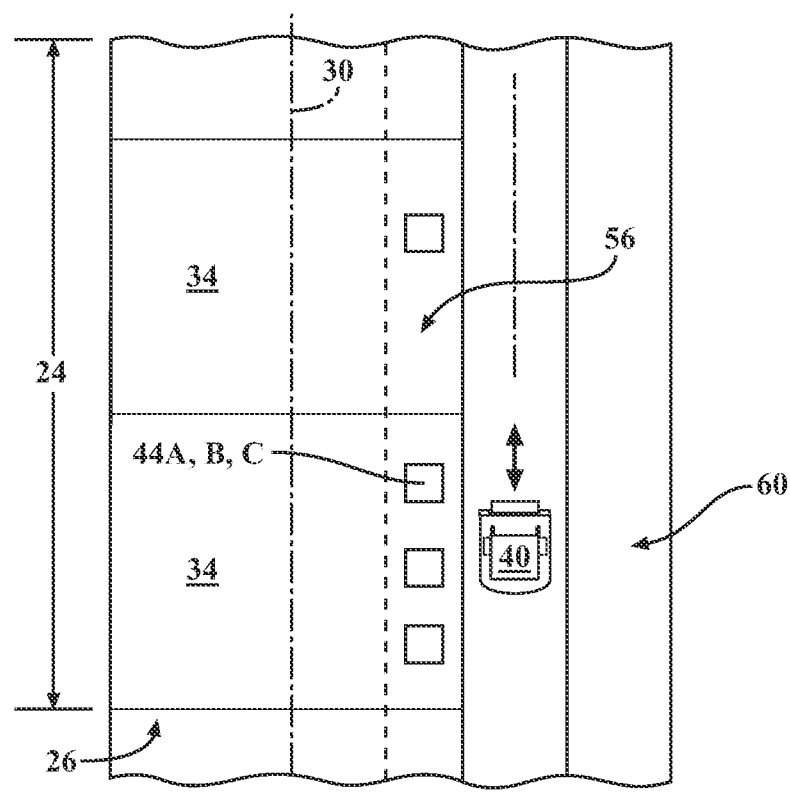
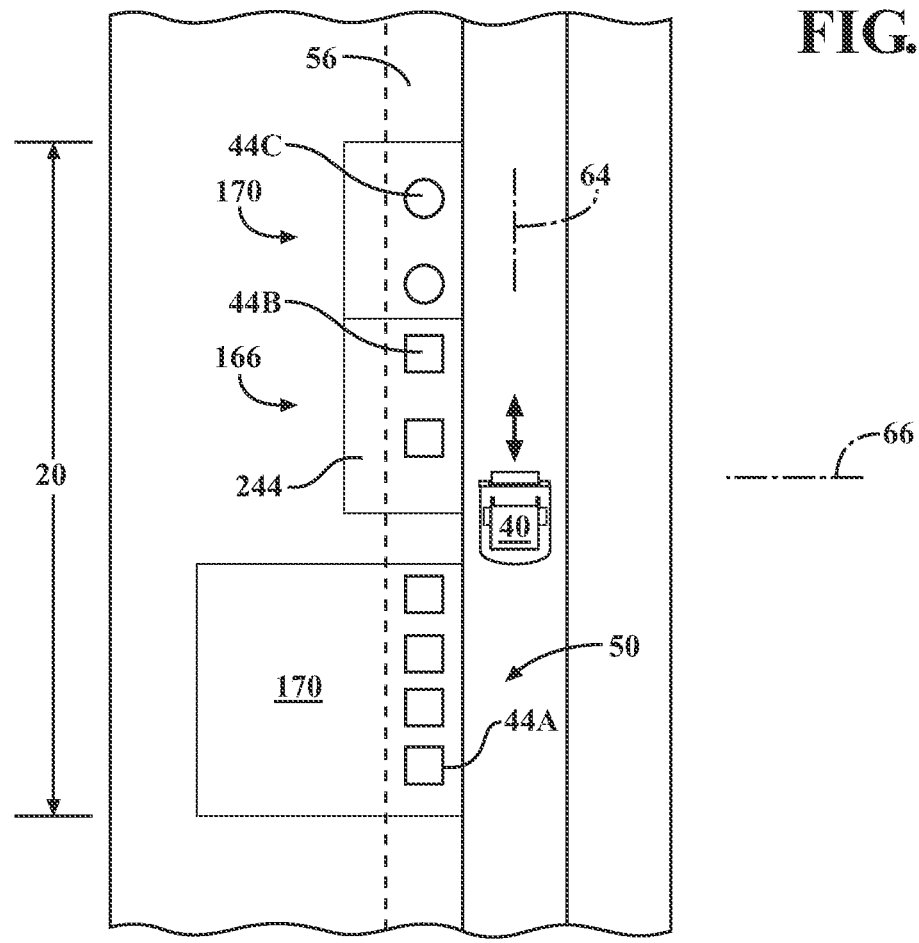
FIG. 3

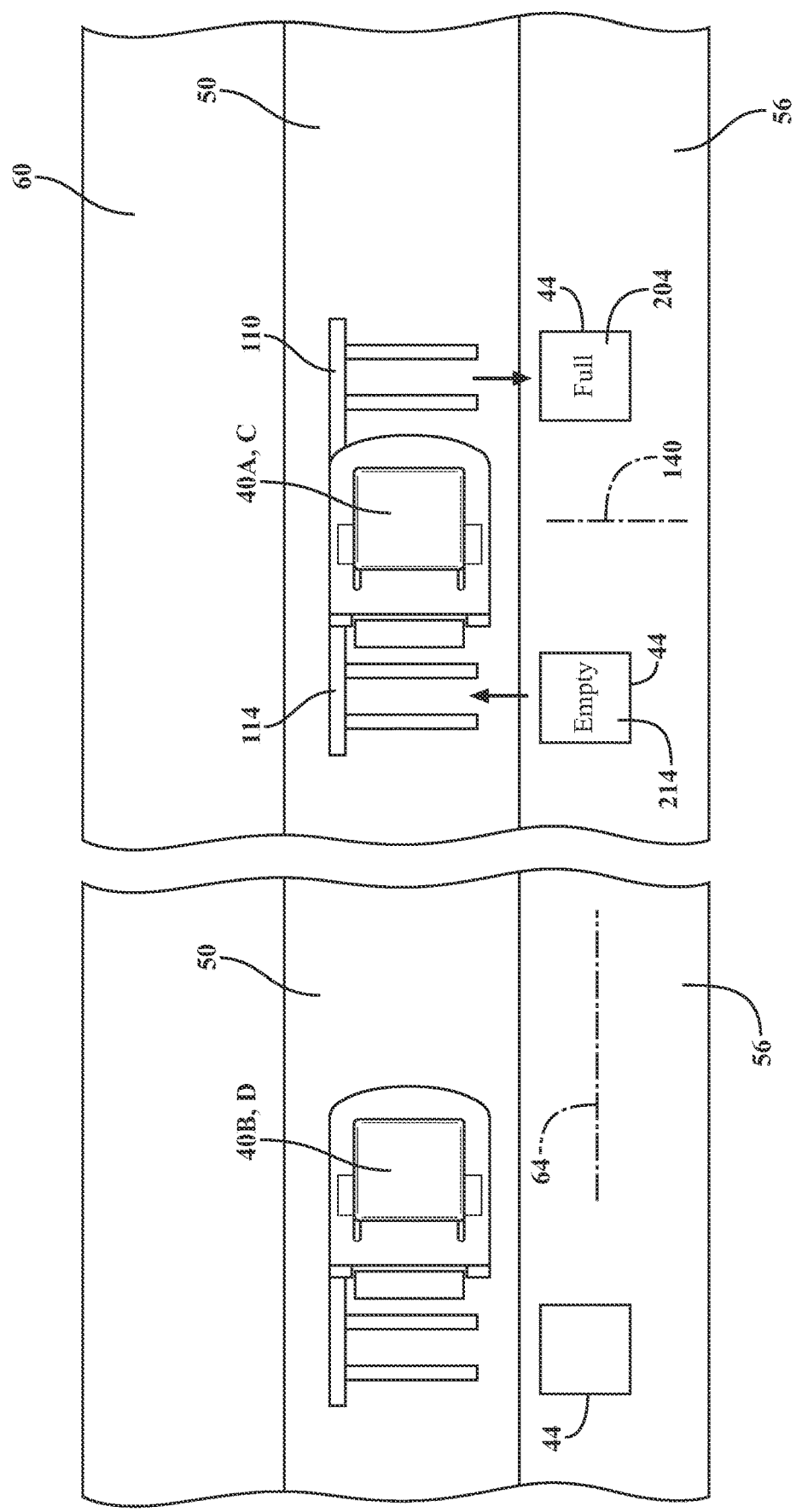

ASSEMBLY MATERIAL LOGISTICS SYSTEM AND METHODS

CROSS-REFERENCE TO RELATED APPLICATIONS

This application claims priority benefit to U.S. Provisional Patent Application No. 63/036,172 filed Jun. 8, 2020, the entire contents of which is incorporated herein by reference.

TECHNICAL FIELD

This disclosure relates to material logistics to support and conduct assembly operations of products, for example passenger vehicles.

BACKGROUND

There is ever-increasing pressure on product manufacturers for the efficient and cost effective manufacture and assembly of products. This is particularly acute in the assembly of passenger vehicles by original equipment manufacturers (OEM's) and their vendors. In order to remain competitive, manufacturers must strive to increase production with fewer assembly facilities and resources. Significant advancements in technology have aided in these efforts, but constant improvement is needed and requested of vendors of the logistical and assembly systems used to assemble the products.

Conventional assembly facilities and systems have made advancements in automating many aspects of product assembly. In many assembly subsystems, use of automated robots, automated guided vehicles (AGV's) and conveyor systems have relieved many of the manually intensive tasks such as material handling of heavy objects and welding of components and subassemblies.

Conventional assembly facilities continue to have significant disadvantages in the facility layout and material logistics needed to support efficient, high quantity volume manufacturing of precision products, for example passenger vehicles. Conventional assembly facilities continue to be designed to include discrete assembly areas or lines for certain operations which position them in distant areas of the facility from other assembly areas. These distant assembly areas then require the partially completed products to be conveyed to other distant areas of the facility where further assembly operations take place. These conveying devices are complex, expensive and disrupt a continual and efficient assembly process.

Conventional assembly facilities further include disadvantages in being able to adapt to changes in the product to be manufactured for a flexible assembly environment. When the product, or product model, is changed to support product orders, hours or even days are needed to change the material logistics and equipment needed to accommodate the product change leading to increased facility or assembly line downtime and inefficiencies.

Conventional assembly facilities include further disadvantages in the systems and devices used to supply subassemblies and components to the various discrete assembly lines and processes. Although advances have been made to provide a continuous supply of components and consumable materials to the assembly lines to support assembly operations, the logistical devices and processes used to supply the components and materials to the assembly lines create bottlenecks, and include duplicative processes and movements of equipment causing unnecessary delays and other deficiencies that slow product output.

Improvements are needed in the logistical material storage, handling and supply of materials and components to support high volume quantity and efficient operation of product assembly facilities.

SUMMARY

Disclosed herein are systems and methods for logistical handling of assembly components and consumable assembly materials to support assembly operations in a high volume quantity assembly facility. In one example application, the methods and systems are useful in a passenger vehicle assembly facility.

In one example, the assembly material logistics system includes a marketplace component storage area operable to temporarily store a plurality of component containers, each supporting at least one component, the storage area having a rack aisle extending in an x-direction. The assembly area is positioned downstream of the storage area and includes at least one assembly line operable to assemble at least one product including the at least one component. The component storage area and the assembly area each include a rack aisle extending in the x-direction positioned in alignment with each other. The rack aisle serves to position full and empty component containers for engagement and transfer of the containers by transfer vehicles.

The exemplary system includes a material aisle positioned directly adjacent to and parallel with the aligned storage area rack aisle and the assembly area rack aisle. A plurality of transfer vehicles selectively and reciprocally move along the material aisle between the storage area and the assembly area. The plurality of transfer vehicles are each independently operable to selectively engage at least one of a full or an empty component container in the storage area rack aisle or the assembly area rack aisle. The transfer vehicles transfer the engaged at least one of the full or empty component containers between the storage area and the assembly area, and selectively disengage the at least one of the full or empty component containers in the storage area rack aisle or the assembly area rack aisle to support assembly of the at least one product in the assembly area.

In other examples of the system, the marketplace storage area includes a large component container storage area including a storage rack having a presentation row positioned in the storage area rack aisle. In other examples, the storage area includes a small component storage area and consumable material storage area positioned adjacent to one another and each including a portion of the storage area rack aisle.

In other examples of the system, the transfer vehicles include a first support and a second support operable to independently engage or disengage full or empty component containers in the storage area and assembly area, and transfer both the engaged full and empty containers between the storage and assembly areas.

In other examples of the system, the assembly area includes at least two assembly cells including a portion of the assembly area rack aisle. The assembly area includes a plurality of programmable robots operable to selectively engage and move components from the assembly area rack aisle into the assembly line for progressive assembly of the at least one product.

An example of a method for assembly material logistics includes storing a plurality of component containers including at least one component in a marketplace storage area positioned upstream of an assembly area operable to assemble at least one product. The method includes selectively positioning predetermined full component containers in a storage area rack aisle extending in an x-direction. Positioning one of a plurality of transfer vehicles in a material aisle positioned directly adjacent to and parallel with the storage area rack aisle. The transfer vehicle selectively engaging a predetermined one of the plurality of full component containers from the storage area rack aisle and removing the full component container from the storage area rack aisle.

The exemplary method further includes the transfer vehicle transferring the engaged full component container along the material aisle downstream to the assembly area. Either the same or a companion transfer vehicle selectively engaging an empty component container positioned in an assembly area rack aisle and removing the empty component container from the assembly area rack aisle that is aligned with the storage area rack aisle. The transfer vehicle depositing the engaged and transferred full component container into the assembly area rack aisle to support assembly of the at least one product.

In one example of the method, the transfer vehicle transfers the engaged empty container along the material aisle for deposit of the empty container in the storage area for restocking. The transfer vehicle then engages a predetermined full component container for transfer to the assembly area to begin the next component supply cycle.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3 is a schematic top view of one portion of the example in FIG. 2.

FIG. 4 is a schematic of an example of operation of two alternate component container transfer vehicles.

DETAILED DESCRIPTION

Referring to FIGS. 1-21 examples of an assembly material logistics system 10 and methods are shown. In one example application, the system and methods are useful in high volume quantity passenger vehicle assembly facilities. It is understood that the invention has many other applications for the assembly and/or manufacturing of other products including, but not limited to, consumer products and other commercial and industrial applications.

Figure 1:
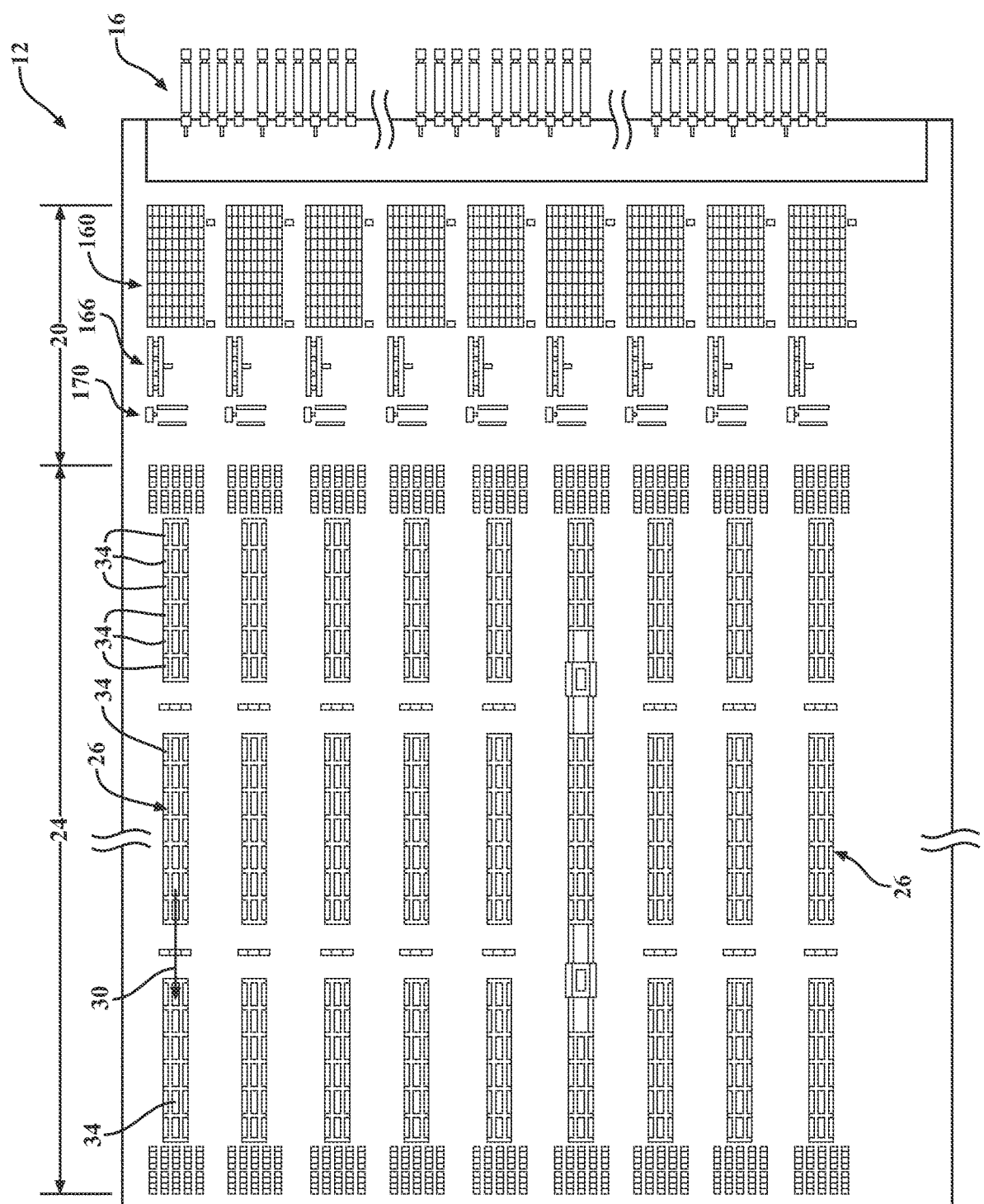
FIG. 1 is schematic top view of one example of an assembly facility showing multiple assembly lines of the present invention.

Referring to FIG. 1 one example of a floor plan layout of a vehicle assembly facility 12 for use in assembling passenger vehicle bodies, or body-in-white structures, is shown. This example includes the assembly of passenger sheet metal bodies whereafter powertrain, suspension and interior components are connected to the vehicle body. As noted, the system 10 has other applications for vehicle assembly and non-vehicle products.

In one example of system and methods 10, a local and/or central control system discussed further below includes an automated or computerized product build schedule program (not shown) which is in communication with automated equipment and devices in the system 10, for example storage racks in the marketplace storage area, autonomous transfer vehicles, and/or the assembly area automated robots and assembly line transfer conveyors, all further discussed below. In one example, the build simulation and/or build schedule computer program monitors and controls the types of vehicles or products to be assembled in a predetermined time period, for example a work shift. The exemplary build schedule program further includes the particular sequence or order of the products to be built, for example, 100 vehicle model A, followed by 50 vehicle model B, followed by 75 vehicle model C, followed by 25 vehicle model A.

In one example of system and methods 10, the exemplary build schedule program also monitors and/or controls the assembly of vehicles or other products in the assembly area according to the predetermined build schedule established for the work shift. One object of system and methods 10 is to receive, temporarily store, and supply components to the assembly area to continually and timely support the predetermined assembly operations for the predetermined vehicles or other products as established by, and/or input into, the build assembly program.

In the FIG. 1 example of system and methods 10, the exemplary facility 12 includes an exterior loading dock and interior warehouse area 16 where semi-trucks or other vehicles deliver large quantities of assembly components, consumable materials used in the assembly process. These materials and other equipment are delivered, unloaded and temporarily stored in warehouse area 16 until needed. An example of the facility floor plan and examples of operation in the loading dock and temporary warehouse or storage area 16 is disclosed in U.S. Pat. No. 8,869,370 assigned to the present Applicant and is incorporated by reference. Other areas and configurations of warehouse area 16 may be used as known by those skilled in the art.

Figure 2:
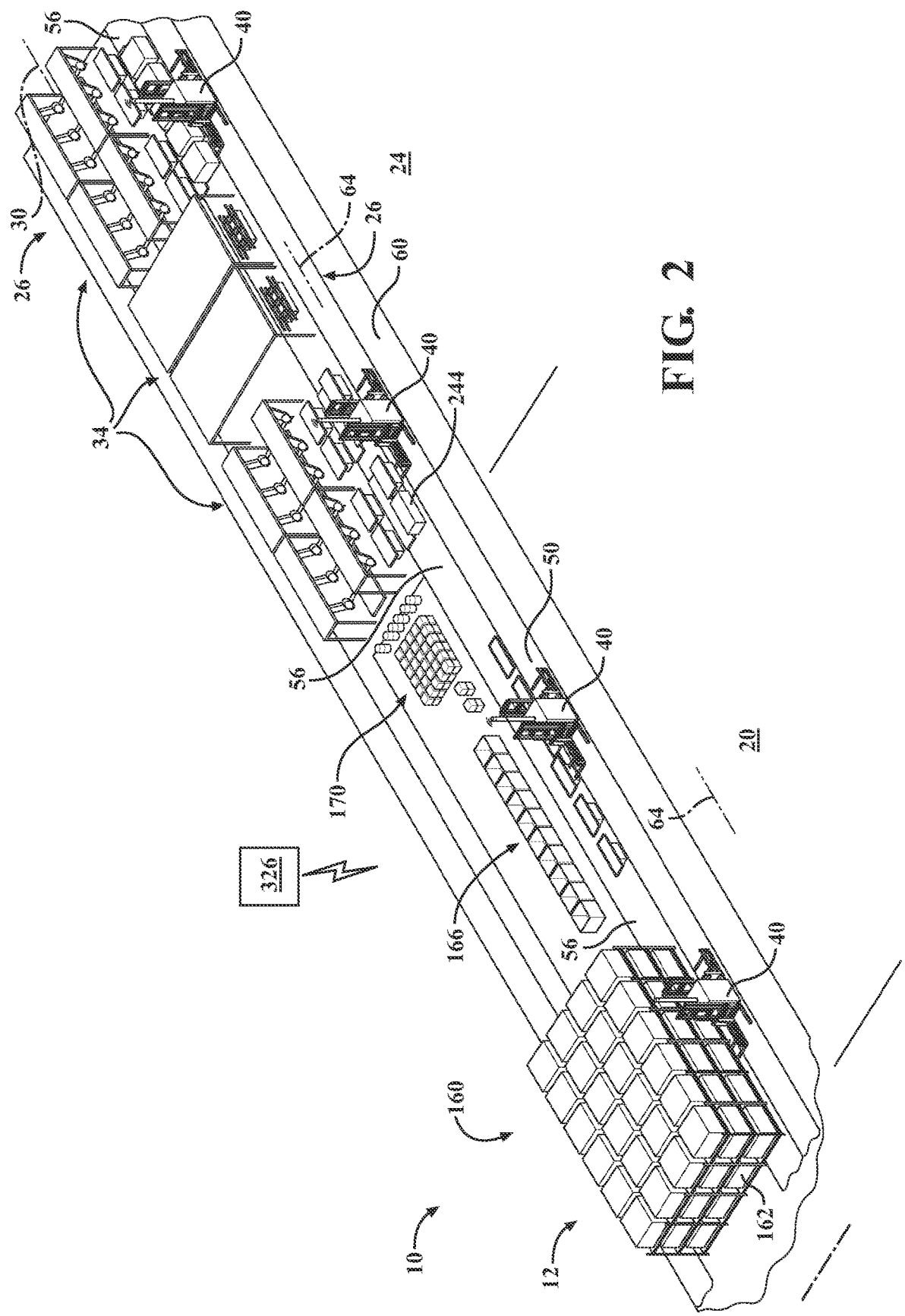
FIG. 2 is a front left perspective view of one example of a material logistics system including one assembly line of the present invention.

Referring to FIGS. 1 and 2, exemplary system and methods 10 include a marketplace component container storage area 20 and an assembly area 24 further discussed below. In the FIG. 1 example facility 12, assembly area 24 includes a plurality of assembly lines 26 (nine shown) shown oriented substantially parallel to one another, each line 26 including an assembly path of travel 30 wherein a product, for example a vehicle body, is progressively assembled in a series of sequentially-positioned assembly cells 34. Each assembly cell 34 includes one or more assembly operations, for example welding a component or subassembly to the progressively built vehicle body by programmable multi-axis robots, discussed further below. In one example of assembly area 24 useful for the assembly of vehicle body-in-white structures, assembly lines 26 may include underbody subassembly lines, underbody main assembly lines, underbody respot lines, bodyside assembly lines, and body framing assembly lines. Assembly lines 26 can be designed, configured, oriented and function to suit the particular application as known by those skied in the art.

Although FIGS. 1 and 2 show the warehouse area 16 and storage area 20 in close position and in straight line alignment with the assembly area 24, it is understood that these areas 16, 20 and 24 can be in different locations and orientations with respect to one another inside facility 12 to, for example, accommodate the existing floor footprint of the facility 12 building, existing facility structures, and predetermined assembly processes and operations. It is further understood that the number, relative position, and orientation of the assembly lines 26 may vary, increase or decrease, to suit the particular application and performance specifications, for example the number of jobs or product builds required per hour. Other system 10 and facility 12 structures, positions and configurations to suit the particular application known by those skilled in the art may be used.

Referring to the FIGS. 2, 5 and 6 examples of system and methods 10, material logistics system 10 uses one or more, and in some examples, a plurality of transport vehicles 40 to engage and transport a plurality of component containers 44 or consumable materials from the marketplace storage area 20 to the assembly area 24 as further described below. In the exemplary system and methods 10, reference to containers 44 includes open, partially open, partially closed, or fully enclosed containers, conventional pallets, platforms, and other structures for supporting and/or containing components. It is understood the component containers may contain a single component or item, or multiple components. As used herein, reference to a full container represents a container with at least one component supported by the container intended for use in the assembly of at least one product in the assembly area. Reference to an empty container represents a container that is depleted of all components, or depleted of a sufficient number of components, such that commercial practice or process considers it depleted or in need of replacement with a full container to support assembly operations.

Reference to components includes individual components or pieces, sub-assembled components, consumable assembly materials, fasteners, and/or other items used directly in the assembly process, or used indirectly by the assembly equipment or operators to support the assembly operations. It is understood that consumable materials may include a broad range of materials used in the assembly process, for example, mechanical fasteners, adhesives, paints, sealants and other fluids, and other items used directly in the assembly process to suit the particular application and/or known by those skilled in the art. Consumable assembly materials may also include materials that are used by equipment or operators to support or maintain the assembly process and/or assembly equipment including water, lubricants, consumable welding or material joining materials, and other physical items and fluids used in assembly processes known by those skilled in the art.

As best seen in FIGS. 3 and 4, exemplary system 10 includes a material aisle 50, a rack or component container aisle 56, and a pedestrian aisle 60 as generally shown. In the example shown, and as more fully described and illustrated below, rack aisle 56 is an aisle, path and/or area wherein component containers 44 are selectively positioned and temporarily stored in the marketplace storage area 20 and assembly area 24 within engaging reach or extension of the transport vehicles 40 positioned in and movable along the material aisle 50. As best seen in FIGS. 2, 3, in a preferred but not exclusive example, rack aisle 56 is a portion of the storage area 20 and the assembly area 24, extending in an x-direction 64 from the marketplace storage area 20 through the assembly area 24. In the preferred example, rack aisle 56 extends in substantially straight line alignment from the material marketplace 20 through the assembly area 24. In one example, rack aisle 56 is substantially parallel to the adjacent assembly line 26 and path of travel 30. It is understood that rack aisle 56 can take other positions, orientations, directions, and alignments relative to the storage area 20 and assembly area 24 to suit the particular application and performance specifications as known by those skilled in the art.

Referring to the FIGS. 3 and 4 example, material aisle 50 is an aisle, path and/or area positioned directly adjacent to rack aisle 56 and substantially parallel thereto. As discussed further below, material aisle 50 is of sufficient width and length to allow transport vehicles 40 to travel along the aisle 50 through and in-between the storage area 20 and the assembly area 24 as generally illustrated. In one example, the width (in y-direction 140) of material aisle 50 is only wide enough to accommodate a single transport vehicle 40 (not wide enough for two transport vehicles side-by-side) to minimize the facility 12 floor area footprint. In another example, the width of material aisle 50 is of sufficient width for two or more transport vehicles 40 to be side-by-side (in y-direction 140) in material aisle 50 allowing the transport vehicles 40 to pass or navigate around other transport vehicles 40 positioned in the material aisle 50 without the vehicles 40 entering the rack aisle 56 or pedestrian aisle 60. It is understood that different material aisle 50 widths may be used to suit the particular application and performance requirements as known by those skilled in the art.

Exemplary system 10 further includes a pedestrian aisle 60 for use in allowing human operators and technicians to walk or travel along or by the marketplace 20 and assembly areas 24 without impeding travel of the transport vehicles 40 moving along the preferably directly adjacent and substantially parallel material aisle 50. In one example (not shown), pedestrian aisle 60 is not included in system 10. In another example (not shown), a rack aisle 56, material aisle 50, and/or pedestrian aisle 60 may be positioned on both sides of the marketplace storage area 20 and/or assembly area 24 to increase the flow of components to the assembly area 24 to support operations. It is understood that alternate numbers, positions, relative positions, configurations, lengths, widths, and/or orientations of material aisle 50, rack aisle 56, and/or pedestrian aisle 60 may be used to suit the application and performance requirements as known by those skilled in the art.

Figure 5A:
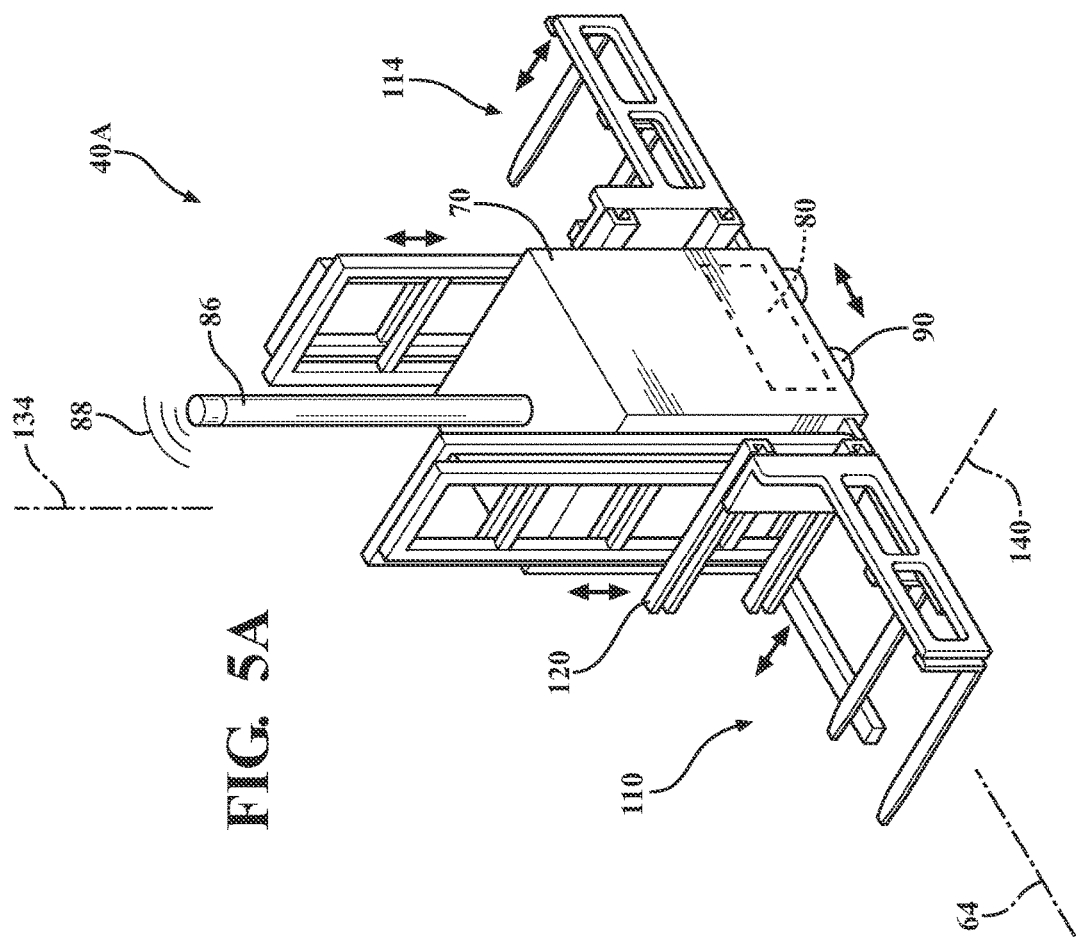
FIG. 5A is a perspective view of one example of a component container transfer vehicle.

Referring to FIGS. 5, 6 and 7, examples of transfer vehicles 40 operable to engage and transport a plurality of component containers 44 along the material aisle 56 to support assembly operations in the assembly area 24 according to the build schedule program are shown. Referring to FIG. 5A an example of an autonomous transfer vehicle 40A is shown. Exemplary transfer vehicle 40A includes a body or housing 70 including a rigid, load-bearing internal frame (not shown). Transfer vehicle 40A includes an onboard control system 80 including the components generally shown and described further below in FIG. 18. In a preferred example, transport vehicle 40A is an automated guided vehicle (AGV) autonomously driven and guided through use of a wireless digital data communication and navigation system including a transmitter/receiver antenna 86, 444 and one or more sensors 88, 428. In one example, transfer vehicle 40A includes onboard software and programmed instructions in the onboard control system 80 which allow the vehicle to autonomously move along material aisle 50 and selectively engage/disengage component containers 44 as generally described herein to support the assembly build operations. In another example, each transfer vehicle 40A receives digital data signals from a local or central control system 326, 616 that is processed by the vehicle 40A onboard control system 80 that is used to move and guide vehicle 40A through predetermined movements and operations as generally described herein.

It is understood that the term autonomous includes both fully autonomous and semi-autonomous operation. In one example, fully autonomous includes that the vehicle 40A does not have an onboard operator and moves and navigates without human intervention or manual control in normal operation. Examples of fully autonomous transfer vehicles 40A, 40B, 40E are shown in FIGS. 5A, 5B, 7A and 7B. One or more of transfer vehicles 40 may also be semi-autonomous or manual in operation. Examples of manual or semi-autonomous transfer vehicles 40 are shown as 40C and 40D in FIGS. 6A, 6B. In these examples, vehicles 40C and 40D may be configured to support a human operator onboard the body 70 to supervise autonomous movement and navigation by the vehicle as described for fully autonomous operation described above, or selectively intervene and/or manually control certain operations or movements of the vehicle 40. Alternately, vehicles 40C and 40D may be manually operated in a conventional manner like a conventional forklift.

Exemplary transfer vehicles 40A, 40B further includes at least two powered wheels 90, in one example four wheels, rotatably connected to the body 70 and engaged with an actuator 432 (FIG. 18), for example an electric motor powered by an onboard rechargeable battery 448, to propel movement of the vehicle 40A along a predetermined path of travel along material aisle 50. In a preferred example described further below, vehicle 40A includes a mode of operation wherein movement of the vehicle 40A is limited to substantially straight-line linear movement along the material aisle 50 along the x-direction 64 through and in-between the marketplace storage area 20 and the assembly area 24. It is further understood that autonomous vehicles 40A, 40B may further include movement and navigation abilities to move and navigate around other transfer vehicles 40 positioned in the material aisle 50, or other objects positioned in the vehicle 40A, 40B predetermined path of travel.

It is understood that an alternate mode of operation or movement may allow the vehicle 40A, 40B to move omnidirectionally, laterally, and/or to negotiate turns like a conventional forklift, to, for example, travel off or away from material aisle 50 for maintenance, recharging, reprogramming or other activities as known by those skilled in the art. In an example where facility 12 is not configured in a generally straight line linear and parallel manner as shown in FIG. 1, transfer vehicles 40 are operable to move along non-straight line or curved paths to suit the particular orientation of facility 12.

Figure 6A:
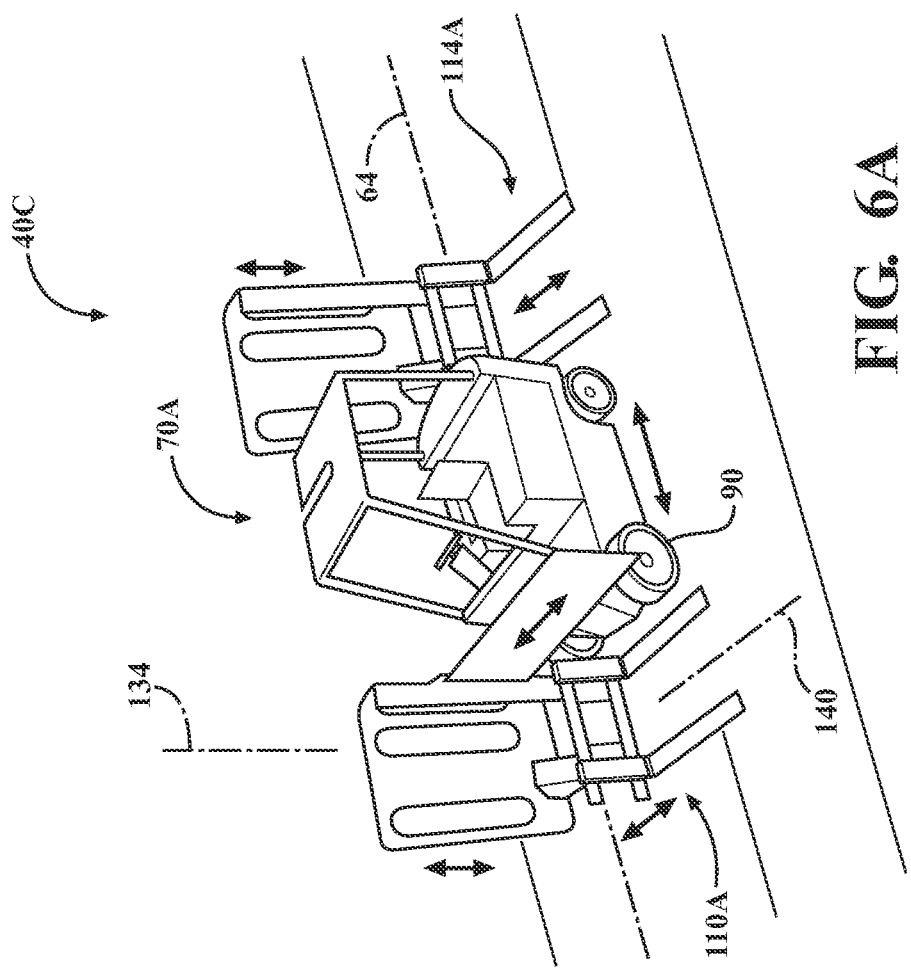
FIG. 6A is a perspective view of an alternate example of a component container transfer vehicle.

Referring to FIGS. 5A and 6A, examples of a transfer vehicle 40A and 40C each having a first support 110, 110A (collectively referred to as first support 110) and a second support 114, 114A (collectively referred to as second support 114) are shown. The alternately configured example in FIG. 6A body includes a cab 70A for housing an operator (not shown) to manually control one or more aspects of the vehicle 40C, for example movement of the vehicle along material aisle 50 and operation of first support 110 and second support 114 to engage and disengage containers 44 as described herein.

In the examples, each transport vehicle 40A, 40C first support 110 and second support 114 can each independently engage, support, disengage and move a container 44 (not shown) positioned on the respective support in the y-direction 140 and z-direction 134 relative to the vehicle body 70. Movement of the support in the y-direction 140 toward and away from rack aisle 56, and vertically in z-direction 134, is made through one or more actuators 432, for example electric and/or hydraulic motors, which are in communication with the vehicle onboard control system 80. In the example, both first 110 and second 114 support are positioned in the same direction to engage a container 44. It is understood that either the first 110 or second 114 support could face in the opposite y-direction 140 to, for example, engage containers 44 positioned in rack aisles 56 positioned on both sides of the material aisle 50.

Figure 5B:
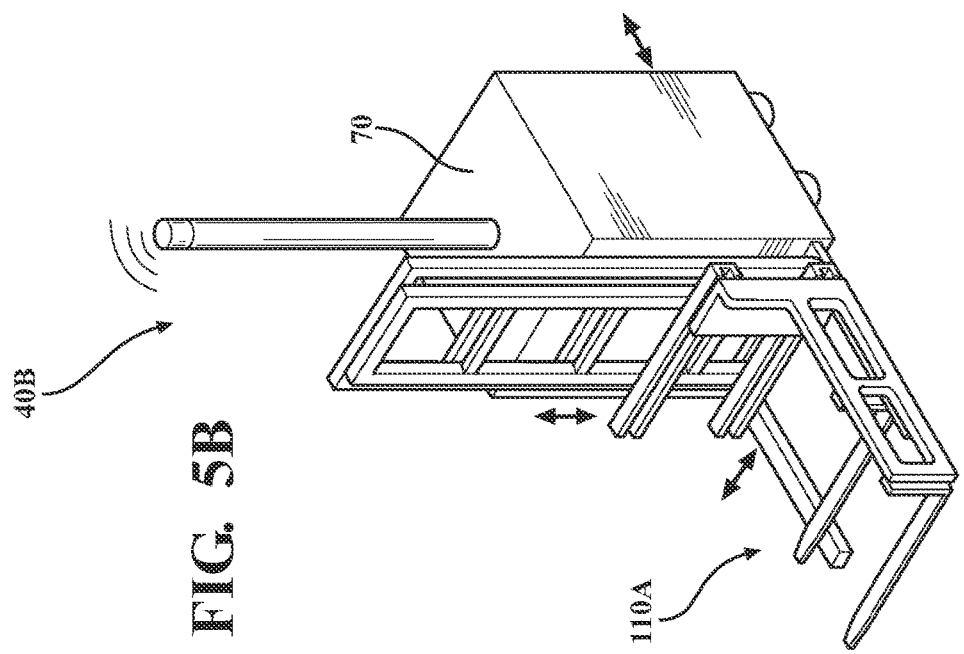
FIG. 5B is a perspective view of an alternate example of a component container transfer vehicle.
Figure 6B:
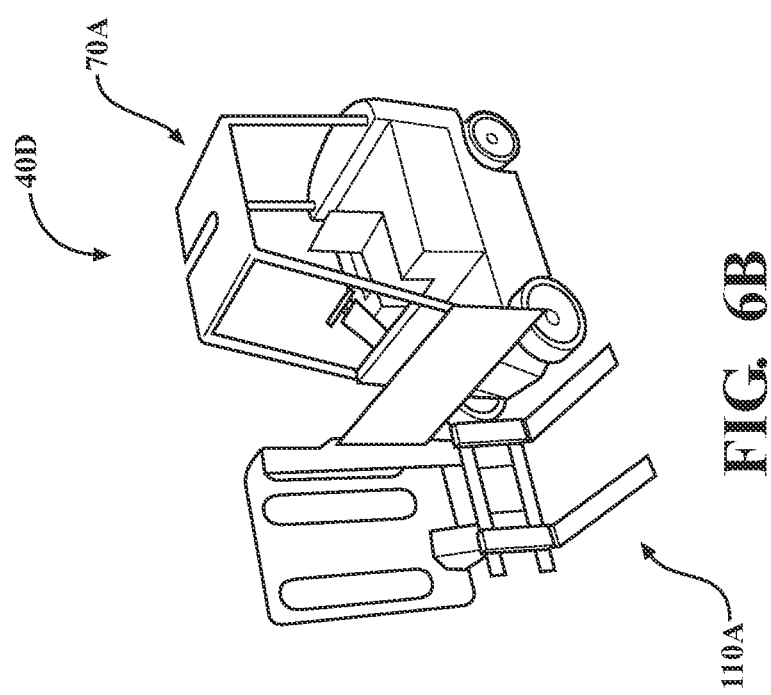
FIG. 6B is a perspective view of an alternate example of a component container transfer vehicle.

Referring to FIGS. 5B and 6B, an alternate autonomous or manual transfer vehicle 40B and 40D are shown (collectively referred to as vehicle 40B). In the example, vehicle 40B includes only a first support 110A. The alternately configured transfer vehicles described include similar, although alternately structured and/or configured components and functions, include the same illustration numbers as described for vehicles 40A and 40C. The structure and operation of the vehicle and first support 110A is otherwise similar to that described for transport vehicle 40A, 40C first support 110. It is understood that transport vehicles 40 may take other forms, sizes, configurations, functions, and/or movements to move along material aisle 50 and engage, support, move, and disengage containers 44 as described herein to suit the particular application and performance specifications, as known by those skilled in the field.

Figure 7A:
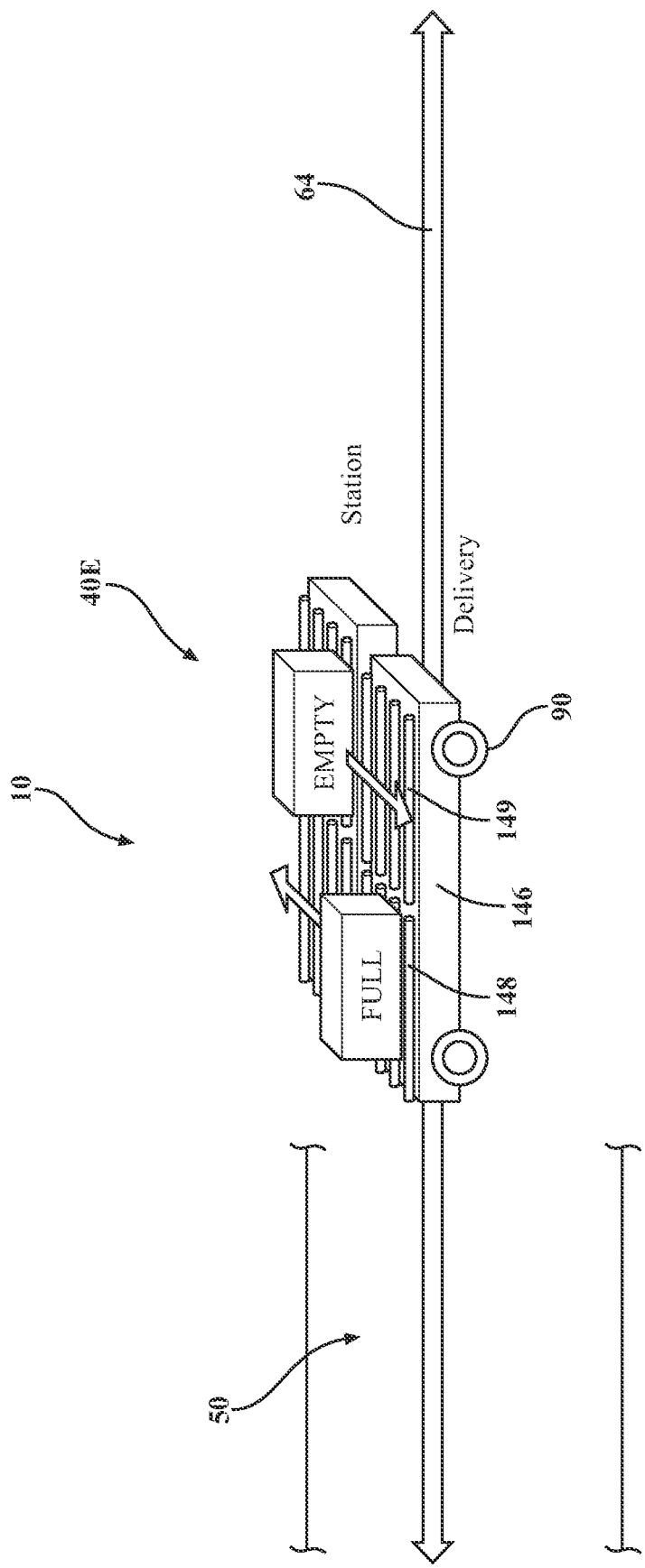
FIG. 7A is a perspective schematic of an example of an alternate component container transfer vehicle.
Figure 7B:
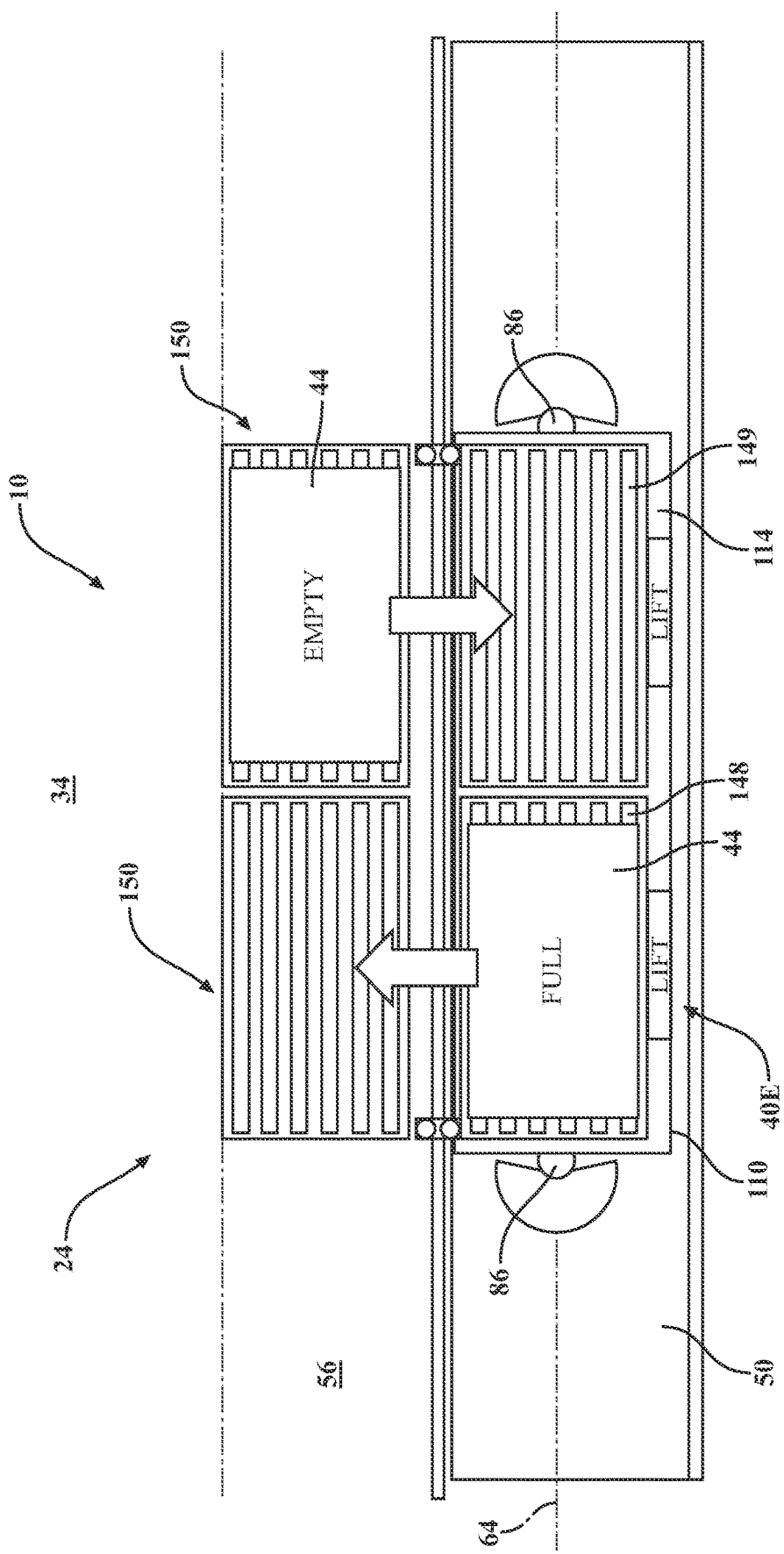
FIG. 7B is a schematic top view of the example transfer vehicle in FIG. 7A.

Referring to FIGS. 7A and 7B, an alternate example of a transfer vehicle 40E is shown. Referring to FIG. 7A, exemplary transfer vehicle 40E is an also an AGV that includes autonomous, or semi-autonomous (collectively referred to as autonomous), driving and navigation capabilities as described above for transfer vehicle 40A. In one example, exemplary vehicle 40E includes an onboard control system 80 including sensors 86 as described above for vehicle 40A. In the example, vehicle 40E includes a base 146, and powered wheels 90 in communication with the control system 80 as generally described for vehicle 40A. As best seen in the FIG. 7B example, a first support in the form of a first set of powered rollers 148 and a second support in the form of a second set of powered rollers 149 are rotatably engaged with the base 146. Each of the first set 148 and second set 149 are engaged with a separate drive actuator 432 (shown schematically in FIG. 18) which allows each of the first set 148 and the second set 149 to selectively rotate independently of each other as shown in FIG. 7B. The drive actuators 432 are in communication with the control system 80.

Figure 15:
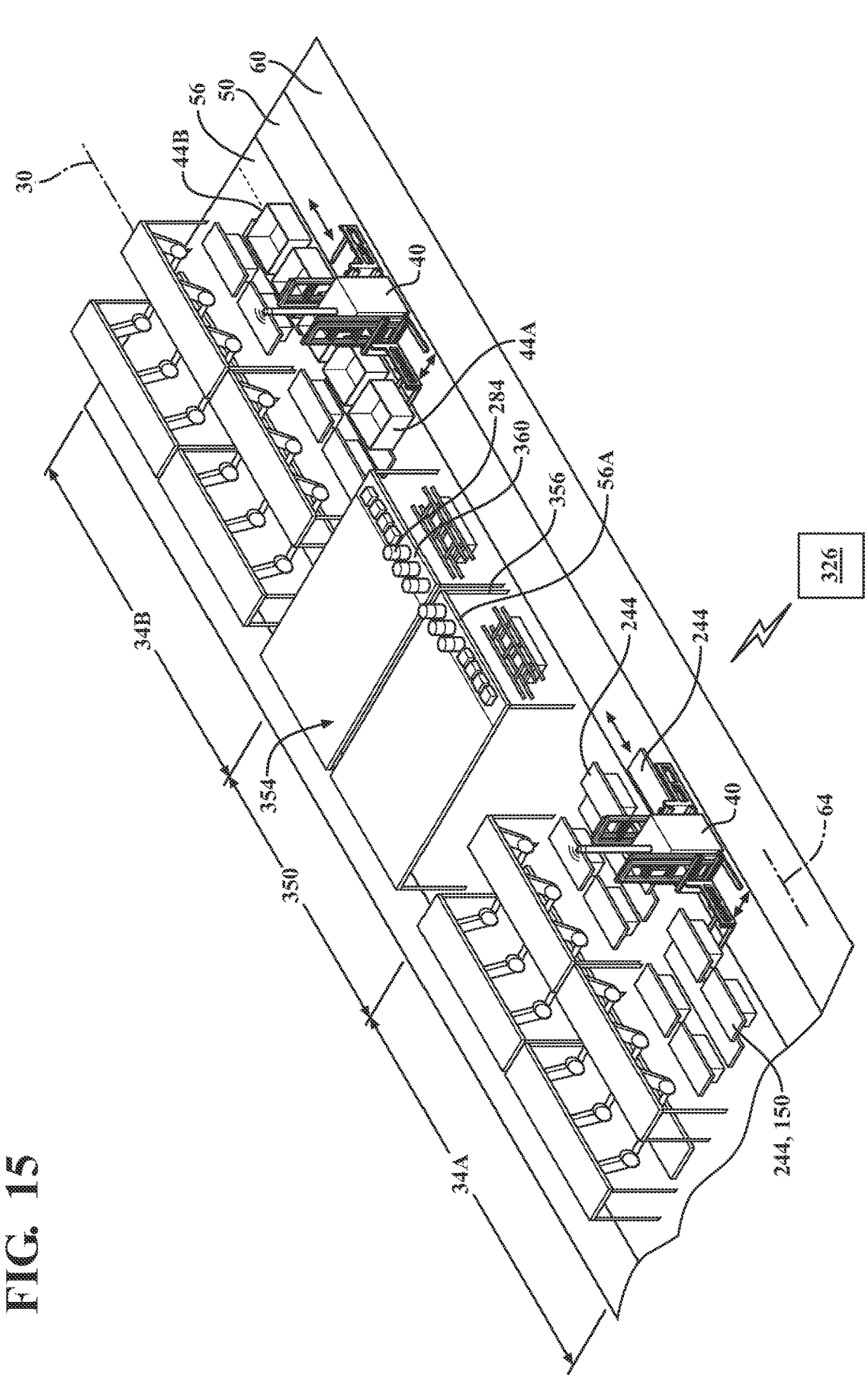
FIG. 15 is an enlarged front left perspective view of a portion of FIG. 2 showing an exemplary assembly area including one assembly line.

In the FIG. 7B example is shown of transport vehicle 40E positioned in assembly area 24 for depositing a full component container 44, for example in assembly cell 34 rack aisle 56, and receiving an empty container 44 from a rack aisle 56 in an assembly cell 34. In the illustrated example as best seen in FIGS. 7B and 15, a stationary support tray or rack 150 is positioned in the assembly area 24 or assembly cell 34 rack aisle 56 and includes similar first and second sets of powered rollers in communication with a separate control system 80 to independently power the support rack 150 rollers.

Referring to FIGS. 7A and 7B, an exemplary use and operation of transfer vehicle 40E is shown. In the example, vehicle 40E is used to support and autonomously transfer a full component container 44 from the marketplace storage area 20 to assembly area 24 assembly cell 34. On achieving a predetermined position in assembly area 24, for example at a predetermined assembly cell 34, alignment in the x-direction 64, and directly adjacent positioning in the y-direction 140 with support rack 150 through sensors 86 or other devices, vehicle 40E can sequentially, or simultaneously, activate first set 148 and second set 149 rollers. In the example, the first set of rollers 148 rotate to move the full component container 44 onto the support tray 150 and receive an empty component container 44 from the support tray 150 onto the second set of rollers 149. In the example, a local or central control system 326 may wirelessly signal and coordinate or control the activation/deactivation of the rollers 148, 149 on the respective vehicle 40E and the support tray 150 to achieve the predetermined transfer of containers 44 as explained.

A similar example of function and use of vehicle 40E is in the marketplace 20. For example, large component storage rack 162 may include powered rollers in the bays 80 as described further below. In one example, the lowest row of the presentation row 182 (FIG. 10) in rack aisle 56 may include powered rollers similar to that as described for support tray 150. Vehicle 40E would receive full component containers 44 and transfer empty component containers 44 into the rack 162, or alternately storage areas 166 or 170 described further below. In one example (not shown), a vertical lift or other elevation device may be used to raise and lower vehicle 40E, or a portion thereof, to reach higher rows in the rack 162. Other applications, vehicle structures, sizes, configurations, movements, and processes for vehicle 40E may be used as known by those skilled in the art.

Figure 8:
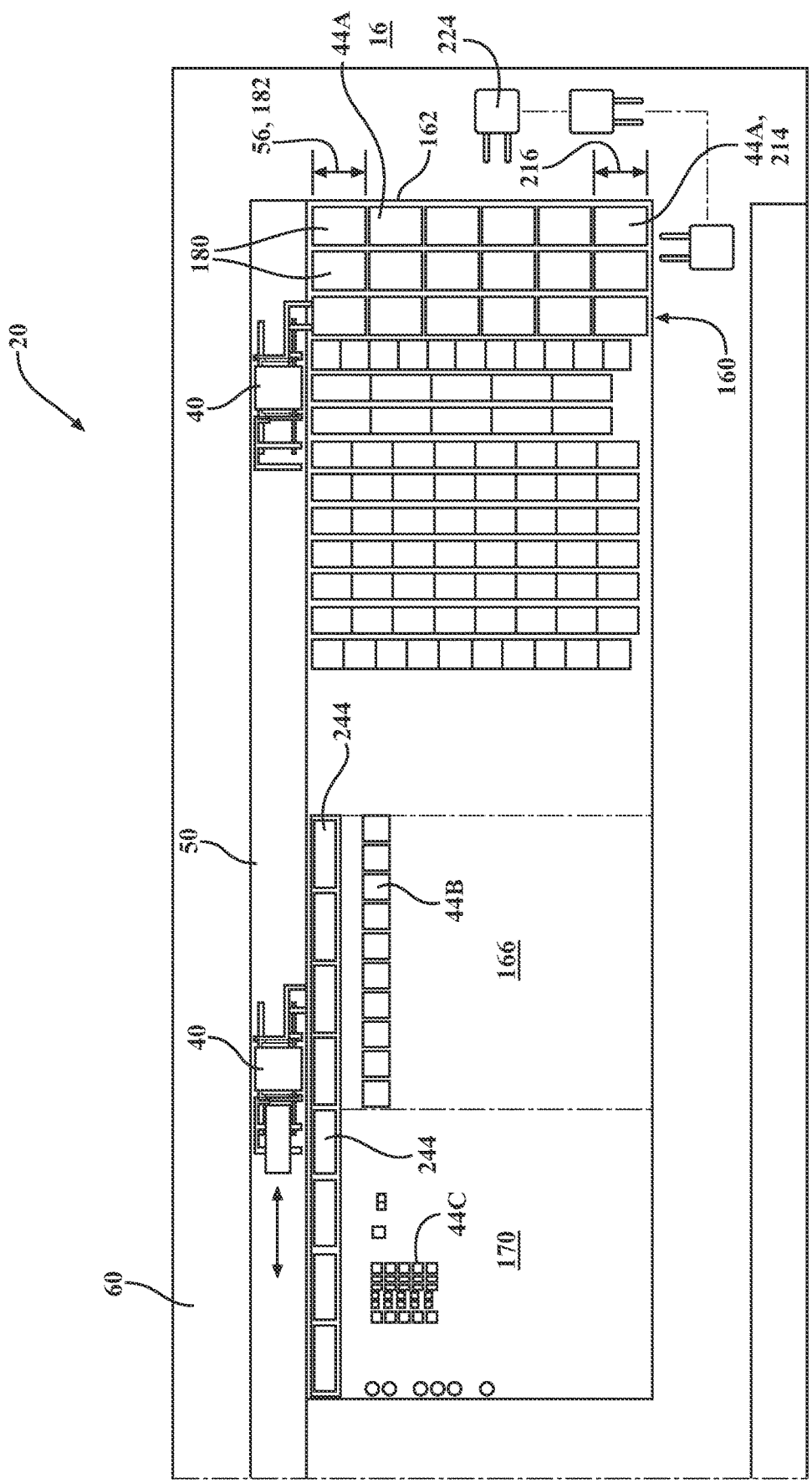
FIG. 8 is a schematic top view of a portion of FIG. 2.
Figure 9:
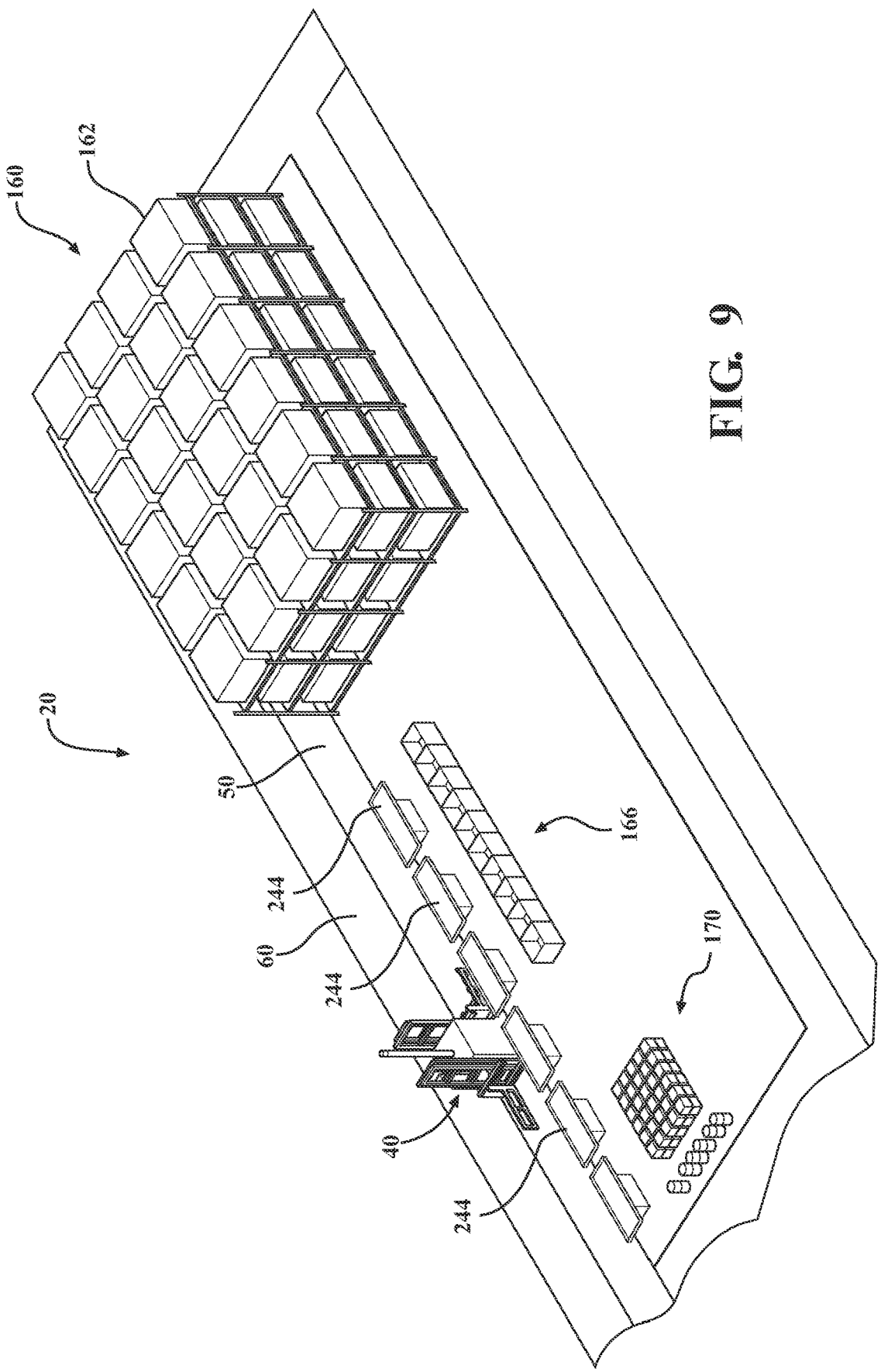
FIG. 9 is a right rear perspective view of a portion of FIG. 2.

Referring to FIGS. 8 and 9 an example of marketplace component storage area 20 is shown. The storage area 20 is operable to temporarily store and organize components for use in assembling the at least one product in assembly area 24. As best seen in the FIGS. 2, 8 and 9 examples, three separate storage areas are used, a first or large component container area or rack 160, a second or small component or small container area or rack 166, and a third or consumable material storage area 170 as generally shown. In the example, the first 160 or second 166 storage areas can be any two of the three areas 160, 166, 170 depending on the particular application and performance requirements. Alternately, only a single, or two of 160, 166 or 170 storage areas may be used (not shown).

Referring to FIGS. 2, 9, 10 and 11, an example of the large component or container storage area 160 is shown in the form of a large component container storage rack 162 useful for temporarily storing and queueing large-sized component containers 44A. In a large or high volume output assembly facility 12, a plurality of large component containers 44A are generally useful for storing larger-sized components which, for example, are typically housed in custom or standardized storage racks or dunnage, for example automotive door panels shown in FIG. 11. Although described as storing large components and containers 44A, it is understood that area 160 and rack 162 may be used for dimensionally small components and other objects to suit the particular application. For example, large quantities of small components, for example hundreds or thousands of mechanical fasteners may be contained in a large container 44A. Alternately, dimensionally small containers, for example 44B described below, may be stored in storage rack 162.

Figure 10:
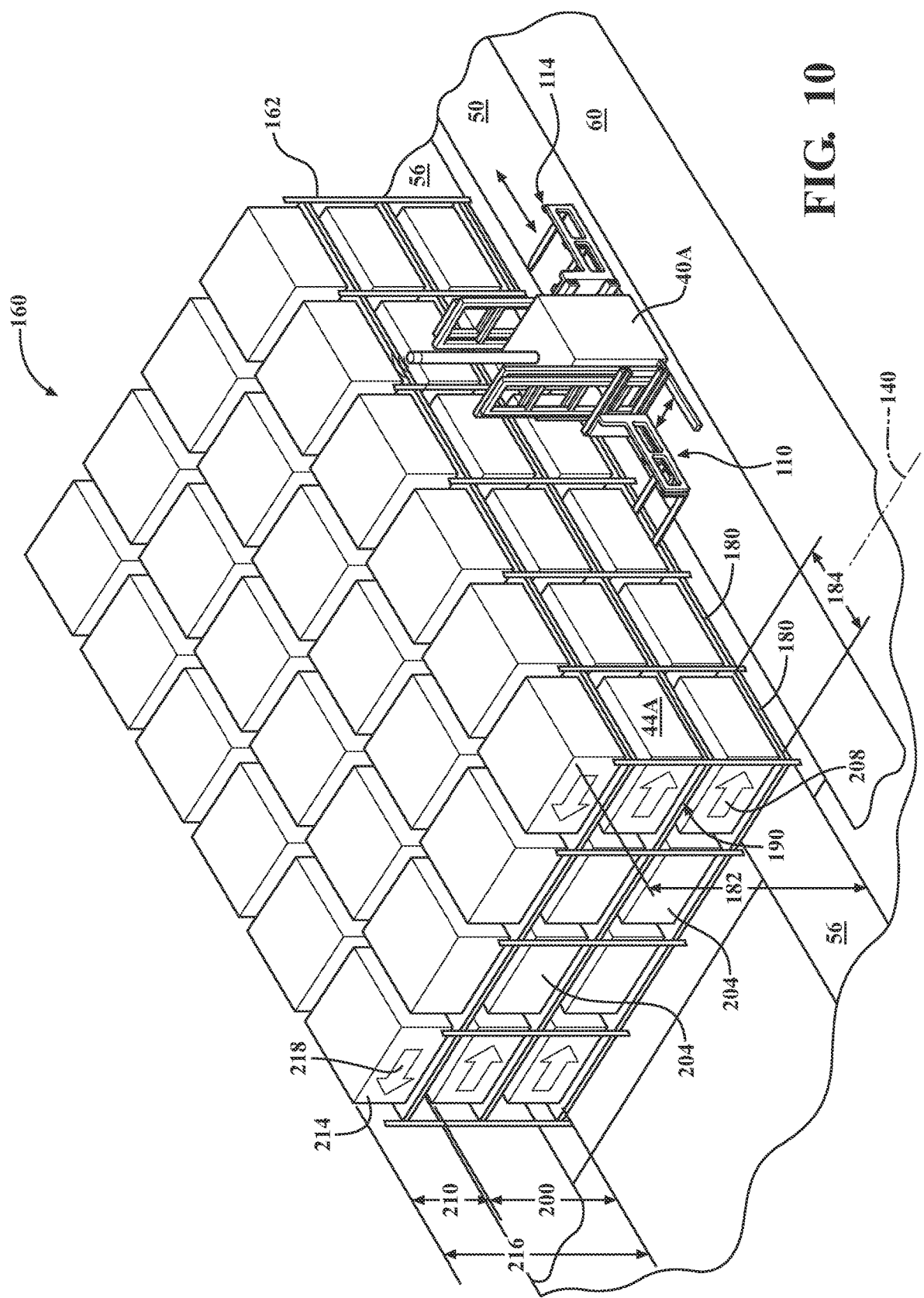
FIG. 10 is an enlarged left front perspective view of a portion of FIG. 2.
Figure 11:
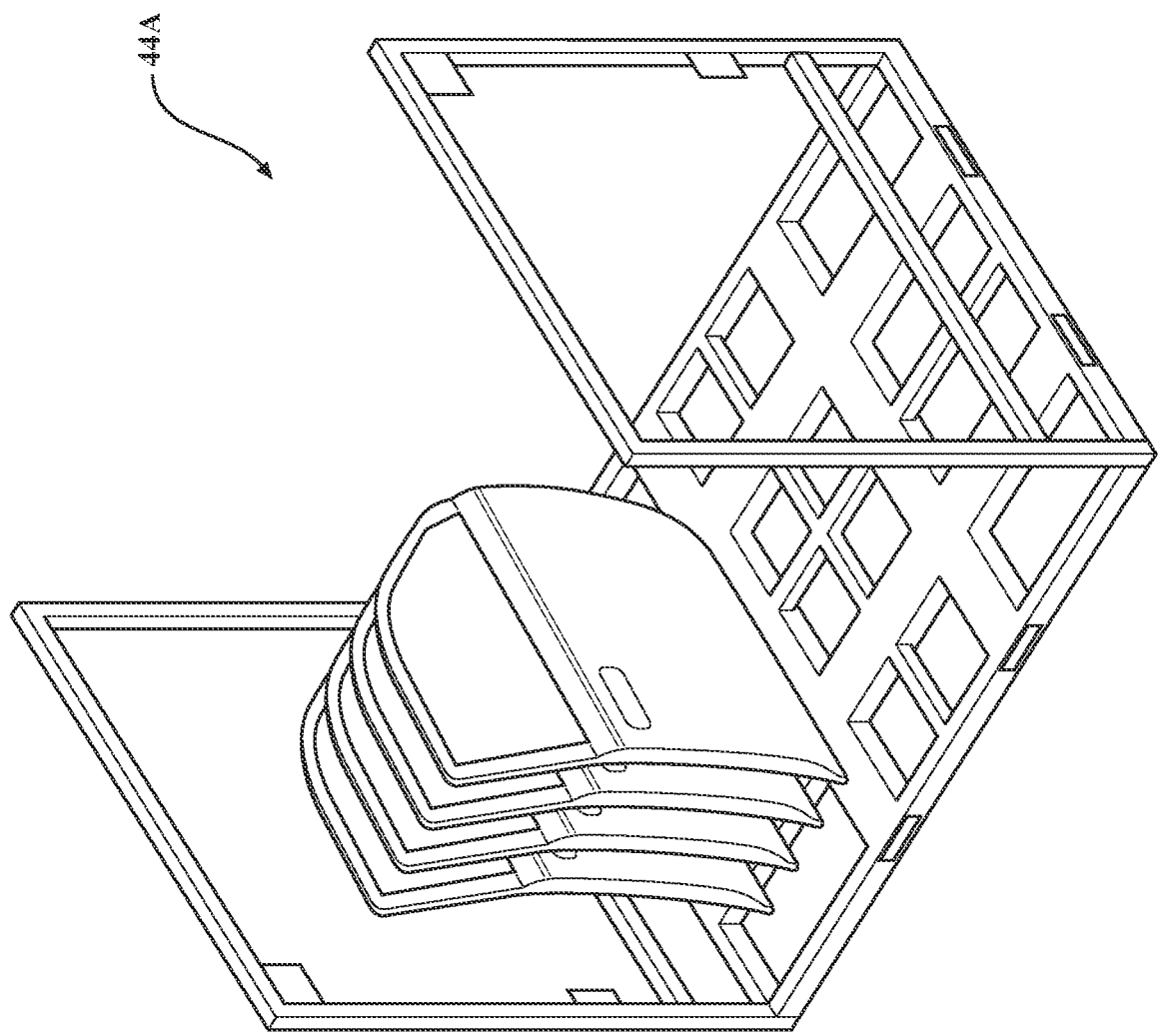
FIG. 11 is a perspective view of one example of a component container.

In the example best seen in FIG. 10, storage rack 162 includes a load bearing frame including vertical supports and shelves which divide the rack 162 into a plurality of bays 180 extending from a presentation row 182 positioned in the rack aisle 56 and directly adjacent to the material aisle 50 as best seen in FIGS. 8 and 10. In the example rack 162, each bay 180 includes a width 184 and height sufficient for passage of large component containers 44A, and at least a portion of transfer vehicle 40, to enter and to pass through such that the transfer vehicles 40 first support 110 and second supports 114 may engage and disengage the component containers 44A.

In the example where the transfer vehicles 40 are autonomous, one or more sensors 86 positioned on the transfer vehicle 40, in communication with the vehicle control system 80, and/or local or central facility control system 326, 616, may be used to position and align the transfer vehicle 40 with the storage rack 162. In the example, the autonomous transfer vehicle 40A is moved and positioned in alignment with the storage rack 162 predetermined bay 180 having the predetermined full component container 44A needed to support assembly operations in a predetermined assembly cell 34. The predetermined full container 44A is positioned in the rack 162 in the presentation row 182 and rack aisle 56 ready to be engaged and removed from the rack 162 by the aligned transfer vehicle 40A. Other vehicle 40A or additional sensors or devices to assist and/or confirm alignment or engagement may be used as known by those skilled in the art. Although described using autonomous transfer vehicle 40A, it is understood that any of the other transfer vehicles 40B-40E described, and other AGV and manual devices for moving component containers, may equally be used in the described manner as known by those skilled in the art.

As best seen in FIG. 10, one example of large component container rack 162 includes a first zone 200 (first two vertical rows of bays 180) for storage and queueing of full component containers 44A, 204 which are selectively movable along the y-direction 140 toward the presentation row 182 and rack aisle 56. Exemplary rack 162 further includes a second zone 210 (third vertical row shown in FIG. 10) for storage and queueing of empty or depleted component containers 44A, 214 which are movable along the y-direction away from the presentation row 182 and rack aisle 56 toward an exit row 216 as generally shown in FIG. 10. In one example of storage rack 162, exit row 216 temporarily holds or queues empty component containers 44A, 214 for removal from the rack 162 as further described below. The use of storage rack 162, and first zone 200 and second zone 210, provide for an efficient and orderly area to temporarily store full component containers 44A, 204 to be sequentially transferred to the assembly area 24 and to efficiently gather, temporarily store, and queue empty component containers 44A, 214 to be restocked with components in another area of the facility, or to be shipped back to a vendor to be restocked with components.

In one example of system and methods 10 storage rack 162, devices mounted on or in the shelves or bays 180 are included to facilitate movement of the large component containers 44A within the storage rack 162, for example toward the rack aisle 56/presentation row 182 or exit row 216. For example, idle rollers or powered rollers (not shown) may be used to move the respective containers 44A (full 204 or empty 214) along the respective y-direction 140. In one example, sensors 84, 426 in communication with exemplary rack powered rollers and a local or central control system 326, 616 may be used to monitor and selectively move containers 44A, 204, 214 within the rack 162 to facilitate storage, queueing, and removal of the containers 44A within the rack 162 to, for example, position full containers 204 in the presentation aisle 182/rack aisle 56 as described.

In the example, full component containers 44A, 204 are selectively removed from the presentation row 182 in rack aisle 56 by the transport vehicles 40. As generally shown in the FIG. 8 example, empty component containers 44A, 214 are removed from storage rack 162 exit row 216 by second transfer vehicles 224 from a rear side of the storage rack 162 opposite the material line 50 so as to not interrupt delivery of components to the assembly area 24 to support assembly operations. Second transport vehicle 224 may be the same construction as the described transport vehicles 40A-E or may alternately be a conventional forklift or other manual, automated, or autonomous lift device as known by those skilled in the art.

Referring to FIGS. 4, an example use of a transport vehicle 40, in the form having first 110 and second supports 114 (transport vehicles 40A, C and E) is shown. In the example, in one operation or cycle positioned at the storage rack 162, the transport vehicle 40A can first engage and remove a full large component container 44A, 204 from the storage rack 162 first zone 200, in the presentation row 182 in rack aisle 56, and move/index and almost immediately deposit an empty large component container 44A, 214 in the storage rack 162 second zone 210, in the presentation row 182 in rack aisle 56. Alternately, two full component containers 44A, 204 can be engaged in one cycle or two empty component containers 44A, 214 returned to the storage rack 162. This leads to greater efficiency and throughput versus a transport vehicle with only a single first support 110 (FIGS. 5B and 6B). In one example (not shown), empty containers 44A, 214 may be deposited into rack 162 at another area of rack 162, for example directly into the exit row 216, or other area of storage area 20.

FIGS. 4 and 12A, 12B and 12C illustrate an exemplary sequence where transfer vehicle 40A picks up or engages a full component container 44A, 204 from storage rack 162, secures and transports the full component container 44A to assembly area 24, and removes an empty component container 44A, 214 from the assembly area 24 for transport back to the storage rack 162 for deposit into the storage rack 162. Alternately as described above, engagement of a full component container 44A, 204 and drop off/deposit of an empty component container 44A, 214 can occur nearly at the same time at the storage rack 162. Alternately, a full component container 44A, 204 can be dropped off/deposited in the assembly area 24 rack aisle, and an empty component container 44A, 214 can be engaged/picked up from the rack aisle 56 at the assembly area 24 in a similar manner.

Figure 12C:
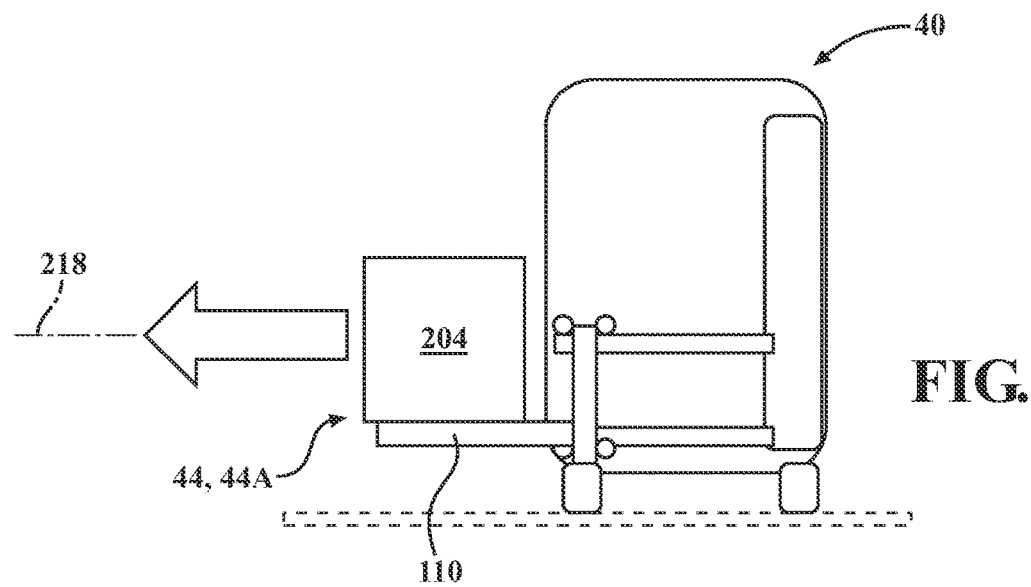
FIGS. 12A-12C are schematic views of alternate positions of a transfer vehicle.
Figure 12B:
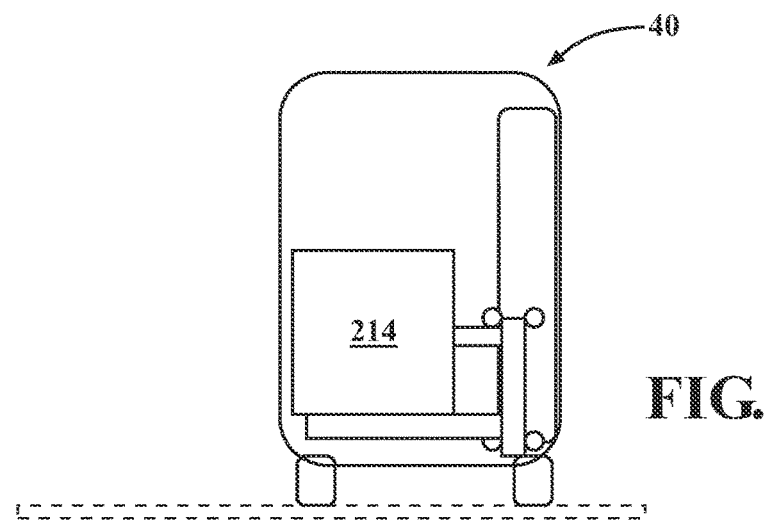
Figure 12A:
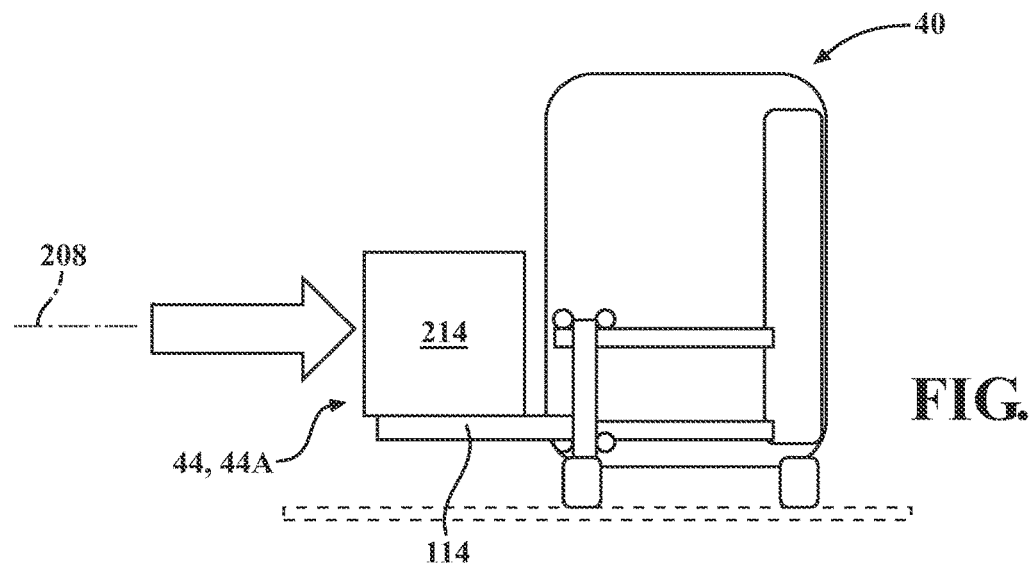

In the example shown in FIGS. 4 and 12A, the transport vehicle 40 is transporting onboard a full container 44A, 204 retrieved from the storage rack 162. In one example, this sequence is initiated by the local and/or central control system 326, 616 when it is detected or determined that in the assembly area 24, and more particularly in a certain assembly cell 34, a component (or component container 44A) is almost depleted and requires restocking of that component in the certain assembly cell 34. This detection or determination of a need for restocking of a certain component in a certain assembly cell 34 may be made by sensors (not shown) positioned in the assembly cell 34, quantitative monitoring of the usage or quantity of the component used in the build schedule, manual observation by a human operator or observation through visual monitoring by, for example a camera or video imaging device, through a predetermined time period, and/or other ways or processes known by those skilled in the art.

In the example, the exemplary vehicle 40A is autonomously moved, positioned and aligned at a predetermined assembly cell 34 in assembly area 24 where a restocked full component container 44A, 204 is needed to support assembly operations in the assembly cell 34. In the example, a depleted and empty container 44A, 214 is positioned in the assembly cell 34. In the example shown in FIG. 12A, the transport vehicle 40A second support 114 is used to engage the empty container 44A, 214 in the assembly area rack aisle 56 and secure the empty container 44A, 214 onboard the transport vehicle 40A. A shown in FIGS. 4 and 12C, the transfer vehicle 40A with the both the onboard full container 44A, 204 and empty container 44A, 214 is then automatically indexed or moved downstream along x-direction 64 to position and align the first support 110 and full container 44A, 204 to replace the just removed empty container 44A, 214. The transfer vehicle 40A transfers and deposits the full container 44A, 204 into rack aisle 56 in the assembly cell 34. The transfer vehicle 40A then returns to the storage rack 162 along material aisle 50 to deposit the empty container 44A, 214 in the storage rack 162 second zone 210 rack aisle 56, or other predetermined area in marketplace storage area 20, as described above.

In one example, transport vehicle 40A would thereafter receive instructions, for example controllers 80, 326, 616 to index, position, align and pick up another full container 44A, 204 with first support 110 from the storage rack 162 in the manner generally described for delivery to the assembly area cell requiring restocking of that component. Although described for autonomous vehicle 40A, the other vehicles 40C and 40E having first 110 and second 114 supports may be equally used for the described actions and operations.

Where a single first support 110 transport vehicle is used, for example vehicles 40B or 40D, a second or companion single support device 40B, 40D can move in coordinated, tandem fashion with a full container 44A, 204, or empty container 44A, 214 and extract or deposit full or empty containers in the storage rack 162 or assembly area 24 as generally described. The use of the devices and processes described provide for a more efficient, and almost continuous or non-interrupted supply of components to support assembly operations. It further provides for efficient removal and logistical handling of empty containers 44A, 214 from the assembly areas 24.

It is understood that alternate storage rack structures 162, sizes, configurations, orientations, components, features, automation devices to support, monitor, and move containers 44A, and functions to suit the particular application and performance requirements known by those skilled in the art, may be used. As an alternate example, storage rack 162 may be configured to separate full containers 44A, 204 from empty containers 44A, 214 in a different manner than described and illustrated. In one example, a separate rack (not shown) positioned adjacent to rack 162 may be used to exclusively receive empty containers 44A, 214 while rack 162 may be used exclusively for full containers 204.

Figure 13:
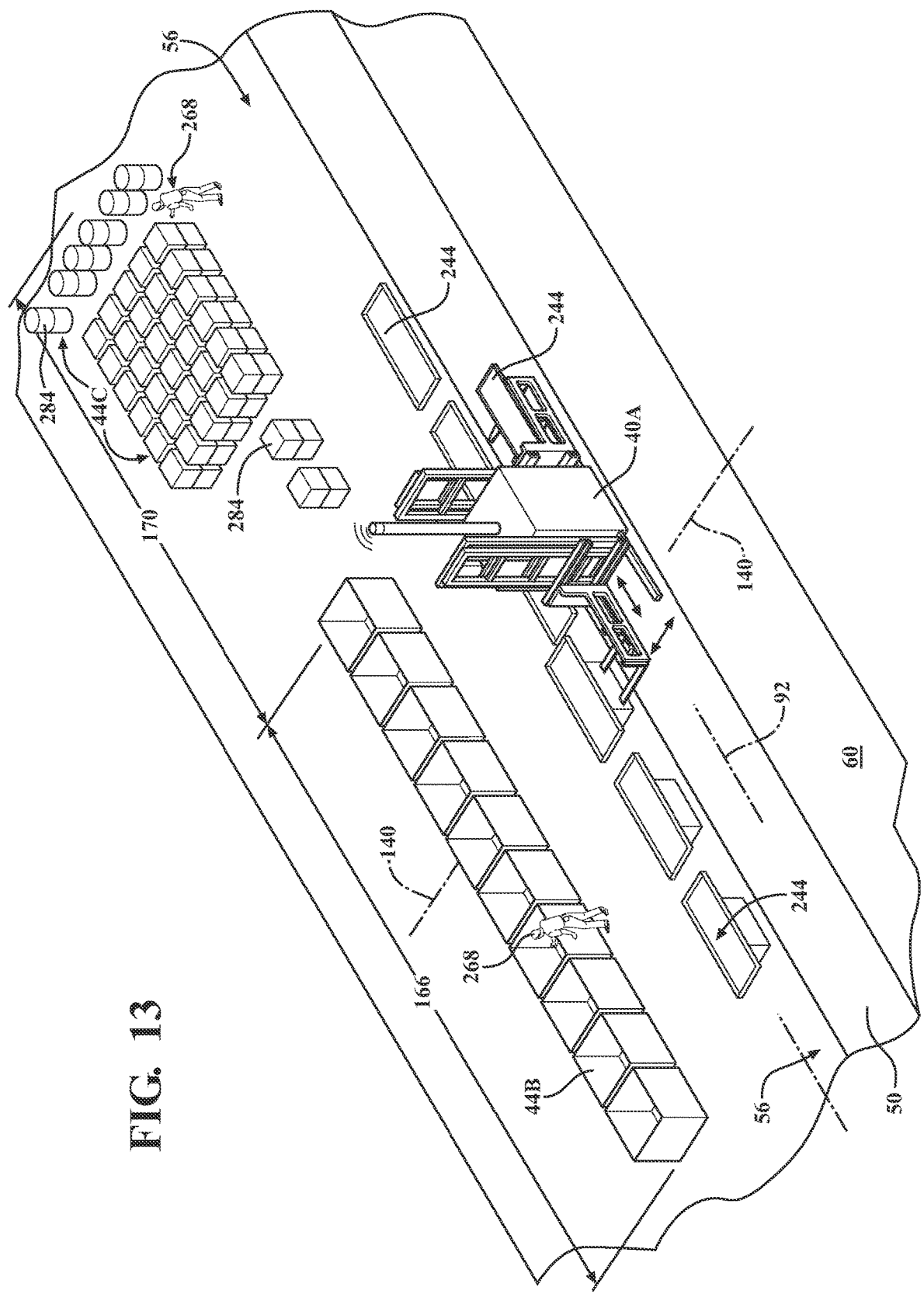
FIG. 13 is an enlarged perspective view of a portion of FIG. 2.
Figure 14:
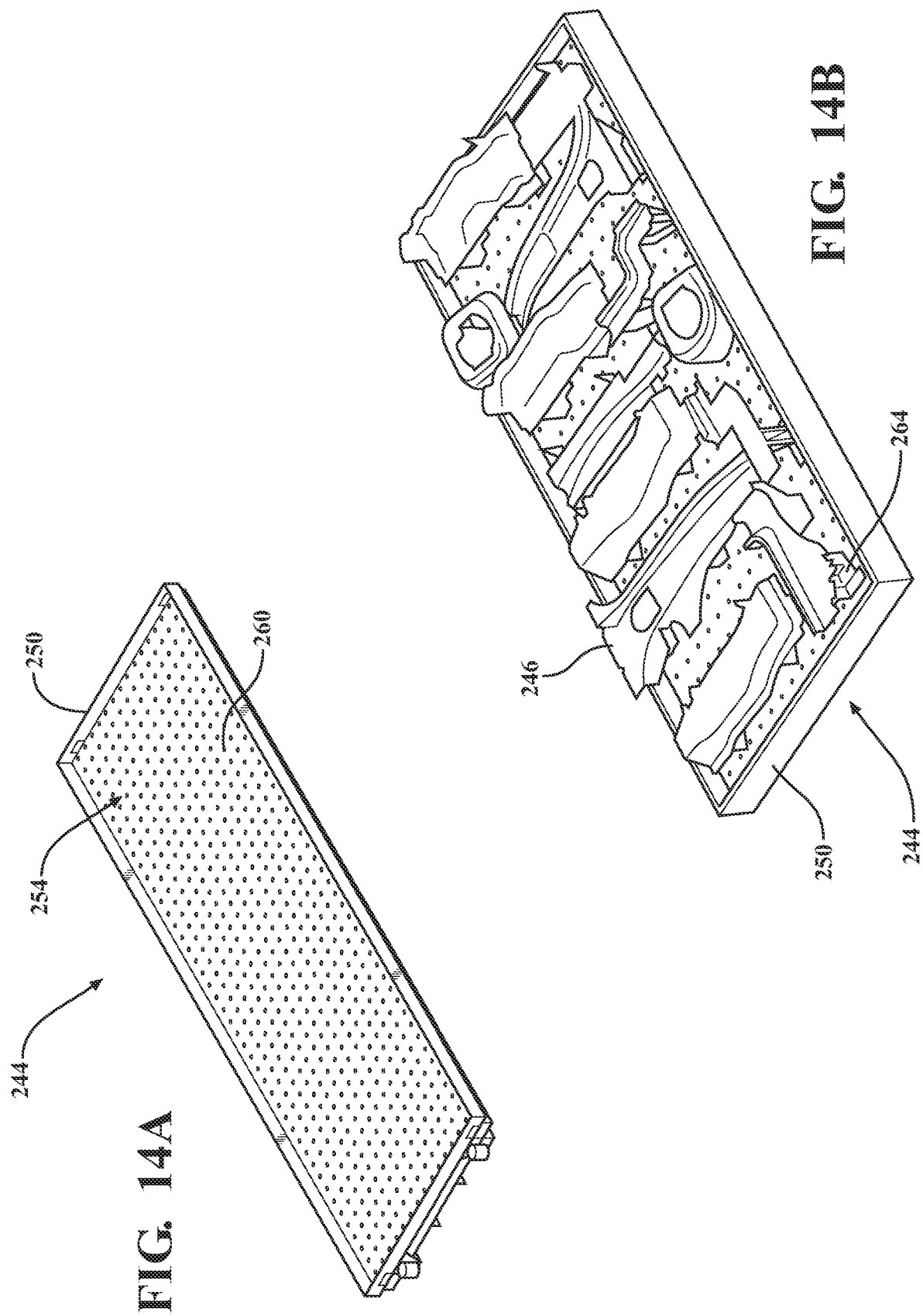
FIG. 14A is a perspective view of an example of a transfer tray.
FIG. 14B is a perspective view of the transfer tray of FIG. 14A including exemplary components.

Referring to FIGS. 2, 13 and 14A, B, an example of the marketplace storage area 20 including a small component container, a small component, and/or a bulk component, storage area 166 is shown (collectively referred to as small component container area). In the example, small component container area 166 is positioned downstream of the large component container area 160 and upstream of the assembly area 24. In the example, area 166 is useful for generally smaller components or subassemblies 246 which do not have custom or specialized storage racks or dunnage 44A than components stored in the large component container area 160. In the example, these smaller components 246 may be shipped into facility 12 in dimensionally small or smaller component containers 44B (may still relatively large in size) and include many of the smaller components 246 loosely positioned therein, for example. As best seen in the FIG. 13 example, a plurality of small component containers 44B may be positioned distant from the rack aisle 56 along the y-direction 140 as generally shown. In one example, small component containers 44B may be positioned in area 166 by second transfer vehicles 224 as described above. Other devices or vehicles, for example pallet jacks or hand trucks, may be used as known by those skilled in the art.

Referring to FIGS. 13 and 14A example of a small component container storage area 166, the plurality of component containers 44 may include a plurality of transfer trays 244 used to receive components 246 and position and orient them relative to the tray 244. In the example, each transfer tray 244 includes a rigid frame 250 and a base support surface 254 for supporting components 246. In one example of system 10, one or more, or a plurality of transfer trays 244 are positioned in the rack aisle 56 directly adjacent to the material aisle 50 in extension or engaging communication by transfer vehicles 40 as generally explained above.

In one example, base support surface 254 includes a precision mounting grid of spaced holes 260 in a geometric dimensioned grid pattern, for example holes spaced every 100 millimeters (mm) in the x and y geometric dimensions or directions, across the surface. In one example, one or more holding fixtures or other tooling 264 are mounted in selected of the mounting grid holes providing for accurate and precise positioning of the components 246 relative to the tray 244. On positioning the tray 244 in an accurate and precise position in an assembly cell 34, programmable robots and/or other automated equipment can engage the component 246 and quickly move it into the assembly cell 34 for processing, for example welding of the positioned component to a progressively assembled vehicle or other product. Other configurations, components, shapes, sizes, surfaces and component positioning devices for transfer trays 244 to suit the particular application and components known by those skilled in the art may be used. Component supporting and holding devices other than trays 244 may be used. In one example not shown, small component containers 44B may be positioned in the storage area 166 rack aisle 166 and be engaged, transported and deposited in assembly area 24 to support assembly operations as described for storage rack 162 and large component containers 44A.

Referring back to the FIG. 13 example, human operators 268 may remove the components 246 from the small containers 44B and position the components 246 onto the trays 244 in predetermined positions for use by the assembly cell 34 as described above. In an alternate example (not shown), automated devices, for example programmable robots and associated end effectors, may be used to transfer the components 246 from small component containers 44B to trays 244. Other devices and methods for transferring components 246 from the small component containers 44B to the transfer tray 244 to suit the particular application and performance requirements known by those skilled in the art may be used. Alternately, the trays 244 stocked with components 246 may be preassembled at a vendor and transported into the facility for use as generally described above. It is further understood that any of the transport vehicles 40A-40E may be used to engage, transport and deposit containers 44B or trays 244 in the manners described.

Referring to the FIG. 13 example, an example of the marketplace storage area 20 including, or consisting of, a consumable material storage area 170 is shown. In the example, consumables area 170 is positioned downstream of the small component container area 166 and upstream of the assembly area 24. In the example, components in the form of consumable materials 284 discussed above, for example bulk fasteners, lubricants, sealants and other materials used directly in the assembly operations, or used indirectly by the equipment in the assembly operations, may be temporarily stored spaced from the rack aisle 56 in the y-direction, and then positioned and queued in the rack aisle 56 of the storage area 170 as described for area 166. These components 284 may be shipped into facility 12 warehouse area 16 in containers 44, including for example on conventional pallets or other support devices, and transported into area 170 by second transport devices 244 or other devices as describe above.

In one example, human operators 268 transfer the full containers of consumable materials 284 to predetermined positions in the rack aisle 56 for ease of engagement by the transfer vehicles 40. Alternately, second transfer vehicle 224 or automated devices such as robots or lifts, position the consumable material 284 in the rack aisle 56 to await engagement by the transfer vehicle 40 according the predetermined assembly or build schedule. In another example, the consumable materials 284 are positioned on transfer trays 244 positioned in the rack aisle 56 as generally described for area 166.

In one example of system 10, the small components 246 and/or consumable materials 284 positioned in the rack aisle 56 are selectively engaged by a transport vehicle 40 in a similar manner as described for the large component containers 44A and transferred to the assembly area 24 as further described below according to the predetermined assembly schedule and restocking needs of assembly area 24. It is understood that other configurations, sizes, positions, and logistical orientations or organization of areas 166, 170 and/or materials 246, 284, may be used to suit the particular application and performance specification as known by those skilled in the art. It is understood that any of the storage areas 160, 166 and/or 170, individually, and/or in combination with one or both of the other storage areas 160, 166 or 170, may be used with one, and/or a combination of the transfer vehicles 40A-40E, to suit the particular application and performance requirements as known by those skilled in the art.

Figure 16:
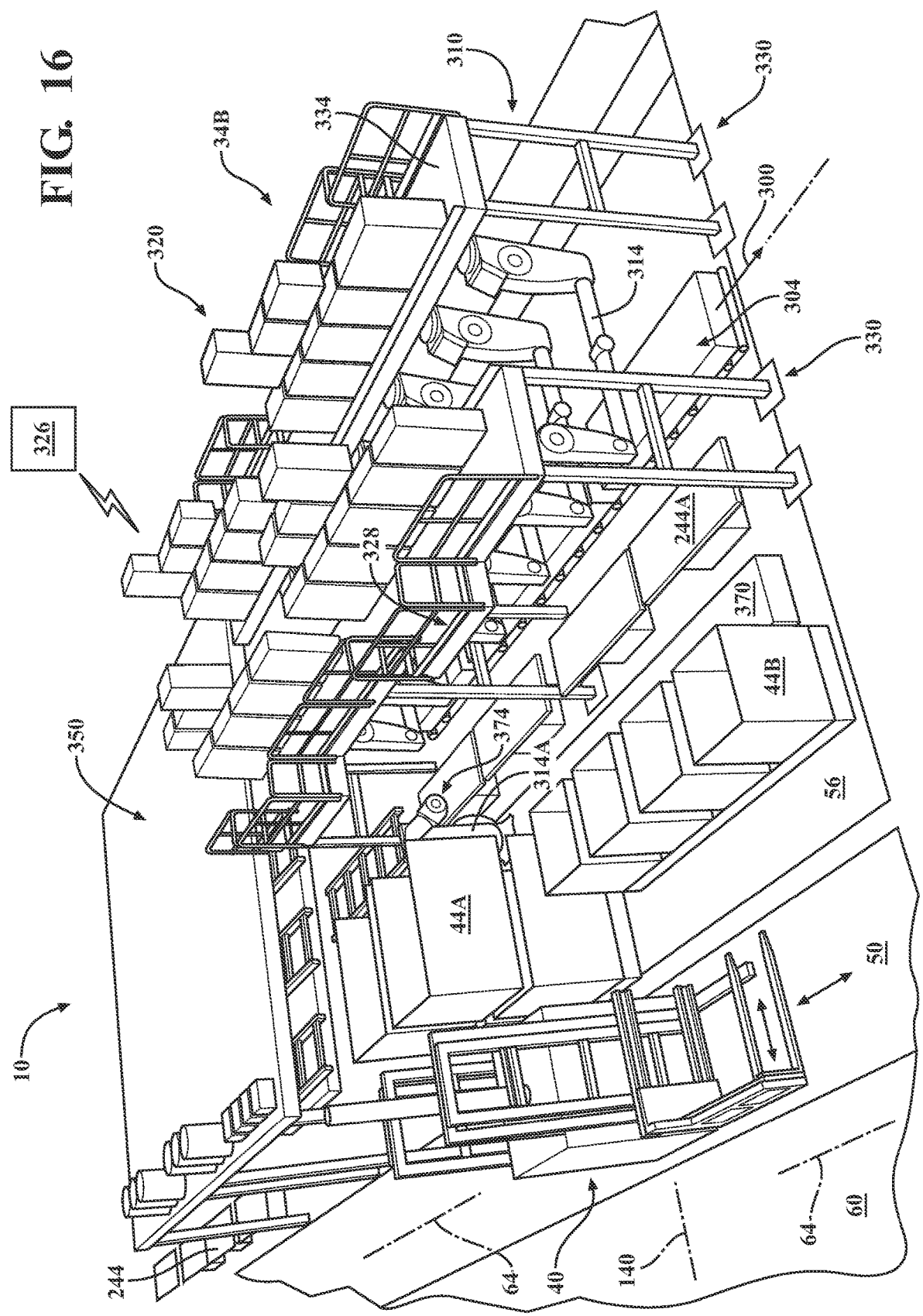
FIG. 16 is a right front perspective view of FIG. 15.

Referring to FIGS. 2, 3, 15 and 16, exemplary system 10 includes an assembly area 24 with one or more assembly lines 26 (nine shown in FIG. 1), and sequentially positioned assembly cells 34 as described above (one assembly line 26 and two assembly cells 34A, 34B shown in FIGS. 2, 15 and 16). In the example assembly area 24, assembly area rack aisle 56 extends into at least a portion of, and in the example shown, extends all through the assembly area 24 as illustrated. In one example, the rack aisle 56 extends substantially in straight line alignment from the marketplace storage area 20 through the assembly area 24 as generally shown and best seen in FIG. 3. In one example, the rack aisle 56 is continuous. In an alternate example (not shown), rack aisle 56 in assembly area 24 is not continuous, and/or is not in straight line alignment, and/or is not in alignment, with rack aisle 56 in marketplace storage area 20. In the example described and shown in assembly area 24, the rack aisle 56 is positioned directly adjacent to and parallel with the material aisle 50 and is further positioned adjacent, or in communication with each assembly cell 34 as best seen in FIGS. 15 and 16. Other positions, locations, and/or orientations of rack aisle 56 in assembly area 24 may be used to suit the application and performance specifications as known by those skilled in the art.

As best seen in FIGS. 15 and 16, in one example of assembly facility 12 and system 10, each assembly line 26 includes a conveying or assembly line path of travel 30 extending through one or more, at least two, or alternately a plurality of, assembly cells 34. In one example of assembly line path of travel 30, assembly pallets 304 are sequentially positioned and moved along the assembly path of travel 30. One example of an automated assembly pallet system is the VERSAPALLET system assigned to the present assignee, and described in U.S. Pat. No. 6,966,427, which is incorporated by reference herein. In one example, each assembly pallet 304 supports a product that is sequentially and progressively assembled by automated devices described below. In one example, the at least one product is a vehicle body-in-white structure. In one example, the at least one product is a first product and a second product, the second product different than the first product. In one example, the first product is a first vehicle model and the second product is a second vehicle model.

It is understood that alternate assembly cells 34 and automated devices using other than assembly pallets may be used. For example, overhead conveying devices, for example the VERSAROLL® and VERSACODER® assembly systems described in U.S. Pat. Nos. 6,799,673; 6,564,440; 6,719,122; and 7,108,189 assigned to the present assignee and incorporated herein by reference may be used. Other assembly line conveying devices and systems known by those skilled in the art may be used.

In the example assembly cells 34A, 34B shown in FIGS. 15 and 16, each assembly cell 34, A, 34B includes an automated assembly system 310 including a plurality of automated, programmable multi-axis robots 314 positioned along, or parallel to, assembly path of travel 30 as generally shown. These robots 314 may be suspended and/or floor mounted. The robots 314 are in communication with control cabinets 320 which are in communication with a local and/or centralized control system 326, 616 including one or more of the components shown in FIG. 18 and further described below. The automated assembly system 310 and control system 326, 616 includes stored in memory programming to support predetermined assembly build operation sequences, for example the at least one product, or alternately for a plurality of different products, as well as control and move the robots 314, and other automated assembly equipment, to carry through the predetermined assembly build operations.

In the exemplary assembly cell 34A, 34B, scaffolding-type structures 330 including a support surface 334 for supporting the robots 314 and control cabinets 320 are used as generally shown. One example of the illustrated structure 330 and robots are described in U.S. Pat. No. 8,201,723 assigned to the present assignee and incorporated herein by reference. In one example the support surface 334 may further support removable support surfaces or tech trays 328 which include predetermined equipment to support assembly operations, for example consumable materials. An example is described in U.S. Pat. No. 10,131,388 assigned to the present assignee and incorporated herein by reference.

In the example assembly area 24 shown in FIG. 15, a consumable material station 350 is positioned between the two assembly cells 34. In the example, an elevated rack aisle 56A is positioned above the floor and in lateral y-direction 140 alignment with assembly area rack aisle 56 generally on the facility floor level as described above. In one example (not shown) consumable material station 350 is positioned adjacent at least one of the assembly cell 34A or 34B. Consumable material station 350 is operable to provide consumable materials to, for example, indirectly support assembly operations by assembly equipment in the assembly cells 34A and/or 34B. For example, where an assembly cell 34 performs a joining operation through application of a bead of adhesive through a robot 314 with an adhesive applicator end effector, consumable material station 350 provides ready supplies of consumable material 284 in close proximity to the assembly cell to provide continuous restocking of the adhesive to support assembly operations.

In the example consumable material station 350, transfer vehicles 40 deliver containers 44 of material 284 for deposition in rack aisle 56A in the manner described above. Removal of empty containers 44 of consumable materials 284 are made by transfer vehicles 40 as described above.

It is understood that consumable material station 350 may take alternate construction, positions, configurations, and orientations relative to assembly cells 34 and assembly area 24 to suit the particular application and performance requirements. For example, consumable material station 350 may positioned on the upstream end or downstream end (not shown) of respective assembly lines 26, or selected areas of the assembly lines 26. In another example (not shown), station 350 may be positioned outside of assembly area 24. It is understood that assembly area 24 and system 10 may not include a consumables material station 350.

In the FIGS. 15 and 16 example, one or more of assembly cells 34A, 34B may further include a transfer robot device or area 370 including one or more, or a plurality of, transfer robots 314A (one shown) positioned laterally along the y-direction 140 and extending along the x-direction 64 between the assembly area rack aisle 56 and the assembly path of travel 30. In one example, transfer robot 314A may remove components from the component containers 44A, 44B or trays 244 positioned in the assembly area rack aisle 56 for placement and orientation on another device, for example a holding fixture or tray 244A, positioned directly adjacent to the automated assembly system 310 and/or assembly path of travel 30 and within communication of the assembly robots 314. In one example transfer robot device 370, transfer robots 314A are positioned on a moving base (not shown), for example a conveyor or automated guided vehicle (AGV) that moves the transfer robot 314A in the x-direction 64 to selectively align with a next predetermined component container 44A, B or tray 244 to engage, manipulate and transfer the component from the container 44A, 44B or tray 244 to the above-described holding fixture or tray 244A, directly adjacent to the assembly path of travel 30.

It is understood that the transfer robots 314A may transfer the engaged components from containers 44A, 44B and/or trays 244 directly into the automated assembly device 310 and/or the assembly path of travel 30 to, for example, weld the component to the progressively built vehicle or at least one product traveling along assembly path of travel 30. In an alternate example, the transfer robot 314A may engage the component and position in it 3-dimensional coordinate space (x, y, z) and the assembly robot 314 may directly engage the component and transfer the component into the assembly path of travel 30 for processing. It is understood that devices other than transfer robots 314A, and/or transfer device or area 370, may use alternate equipment and/or devices, and/or take other configurations, positions, and operations than as described to suit the particular application and performance requirements.

In an alternate example (not shown) the assembly area rack aisle 56 is positioned directly adjacent to, or within communication or reach of the assembly robots 314 in the automated assembly system 310. In this example, the assembly robots 314 can articulate, engage and transfer the component from the containers 44A, 44B and/or trays 244 directly into the automated assembly system 310 and/or assembly path of travel 30 for direct assembly processing without the need for a transfer area 370 or transfer robots 314A. It is understood that any of the above-described individual equipment, devices and/or processes can be used in combination with all, or selected of, the other individually described equipment, devices and/or processes to suit the particular application and performance specifications of the assembly area 24 or facility as known by those skilled in the field.

In exemplary system and methods 10, the one or more, or plurality of, transfer vehicles 40 supporting engaged full component container 44 selectively move along material aisle 50 into the assembly area 24 as best shown in FIGS. 15 and 16. The component containers 44 (44A, 44B shown) are selectively positioned in the assembly area 24 according to the assembly cell 34 operation. For example as best seen in FIG. 16, full large component assembly containers 44A are positioned by the transfer vehicles 40 into assembly cell 34B rack aisle 56 by as described above. As best seen in FIG. 15, full transfer trays 244 supporting components 246 are similarly positioned by transfer vehicles 40 into assembly cell 34A rack aisle 56 as described above. Consumable assembly materials 284 are positioned into consumable material station 350 rack aisle 56A as described above. It is understood that the component containers 44A, B and trays 244 may be positioned in different positions other than the rack aisles 56 in assembly area 24 to suit the particular application and performance requirements as known by those skilled in the art.

In the system 10 example, the transfer vehicles 40 upon reaching the predetermined destination or position in assembly area 24 according to the onboard component container 44, tray 244, or consumable material 284, extend the first 110 or second 114 support in the y-direction 140 to position the component container 44, tray 244, or consumable material 284 into the rack aisle 56, 56A and then disengage it to deposit the it in the rack aisle 56 or 56A. In one example where a transfer vehicle 40 includes first 110 and second 114 supports (for example FIGS. 5A, 6A and 7A), both a full component container 44, tray 244, or consumable material 284 can be deposited in a rack aisle 56, 56A and an empty component container 44, tray 244, or consumable material 284 can be removed from the assembly area 24 in one visit or cycle of the transport vehicle 40 as described above. As described, this visit or cycle can also occur in the marketplace area 20.

These described devices and processes greatly improve the efficiency and throughput of the transfer vehicles 40, marketplace storage area 20, assembly area 24 and system 10 overall. The design and utilization of material aisle 50 and transfer vehicles 40, rack aisles 56, 56A, and pedestrian aisle 60 also reduces the footprint or facility floor area that is needed to support high-volume quantity assembly operations, while increasing efficiency and unit assembly or throughput. The system 10 further provides a high level of automation through use of autonomous transfer vehicles 40 in combination with automated assembly devices and system 310.

Although the above described system 10 examples have described for exemplary purposes and convenience an assembly area 24 including a single assembly line 26, it is understood that assembly area 24 may include at least one assembly line 26, or a plurality of assembly lines 26. In the example shown in FIG. 1, system 10 assembly area 24 includes a plurality of assembly lines 26 (none shown), each including a plurality of assembly cells 34. In the example, all of the plurality of assembly lines 26 are oriented to be substantially aligned extending in a x-direction 64, and are substantially parallel to one another. In the example, each assembly line 26 includes a dedicated assembly line rack aisle 56 (or assembly area rack aisle) as described above and best seen in FIGS. 3, 15 and 16.

In the FIG. 1 example, each assembly line 26 further includes a dedicated (or assigned) marketplace storage area 20 including a storage area rack aisle 56 aligned with the assembly area rack aisle 56 as described above. In one example, the dedicated storage area 20 would include only components for use in the particular assembly line 26. As described above, the storage area 20 may include one or more, or all of, the areas 160, 166 and/or 170. In the example, where multiple assembly lines 26 are used, a dedicated material aisle 50 is used for each assembly line 26 positioned directly adjacent to the rack aisle as described above. In one example, a dedicated pedestrian aisle 60 may also be used. In the example, for each assembly line material aisle 50, at least one of the plurality of transfer vehicles 40, or a plurality of the plurality of transfer vehicles 40, reciprocally move between the respective dedicated storage area 20 and the respective assembly area 24, or assembly line 26, to engage, transfer, and disengage component containers 44 as described in the examples above.

In an alternate example of FIG. 1 (not shown), one material aisle 50 and transfer vehicles 40 may be "shared" between two adjacently positioned assembly lines versus having two dedicated material aisles 50 (one for each assembly line 26) and transfer vehicles 40 for each material aisle 50. In this example, the transfer vehicles 40 selectively engage and transfer components to selected of the shared assembly lines 26 to support assembly of the at least one product in the respective assembly line 26 according to the build schedule. In this example, a single marketplace storage area 20 may also be "shared" between two assembly lines 26 (versus a dedicated storage area 20 for each assembly line 26) in a similar manner. Other configurations of system 10 may be used to accommodate the application or performance specifications as known by those skilled in the art.

Figure 17:
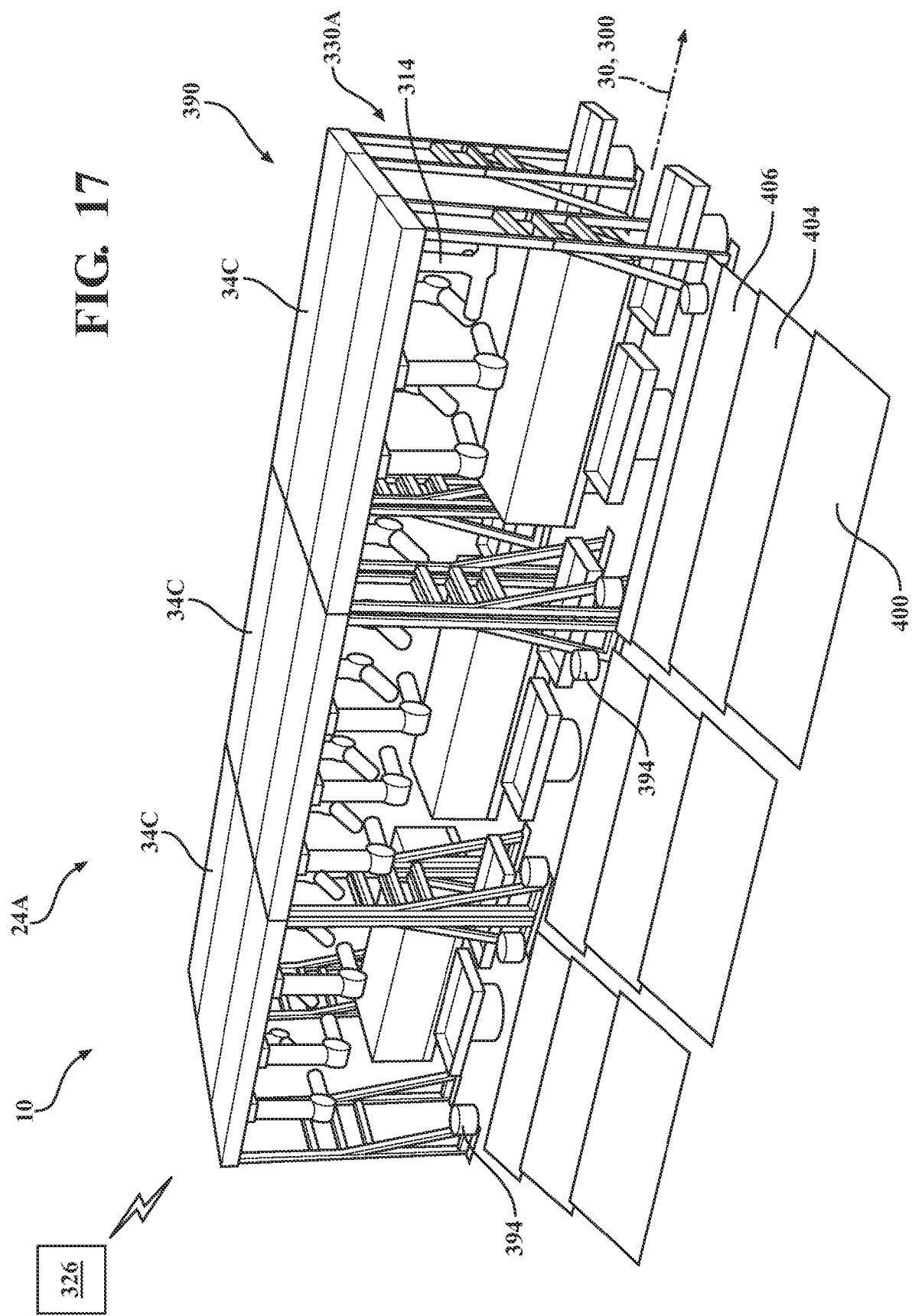
FIG. 17 is an example of an alternate assembly area including an example of a motion detection safety system.

Referring to FIG. 17, an example of system and methods 10 includes a vision detection safety system 390. In the example safety system 390 is positioned in assembly area 24, for example alternate assembly area 24A and assembly cells 34C as shown. In the example, one or more, or a plurality of, sensors 394 are used to identify predetermined detection zones, for example a first zone 400, a second zone 404, and a third zone 408 as generally shown in FIG. 17. The sensors 394, 428 are in communication with a local or centralized control system 326, 616 including components shown in FIG. 18 and generally described below. As described above, the local or central control systems 326, 616 are also in communication with assembly area 24 automated equipment, for example vehicles 40, robots 314, 314A, and automated assembly system 310.

In one example of safety system 390, first zone 400 defines an area where detection of a moving object, for example a human operator or other piece of equipment, for example transfer vehicle 40, does not alter operations in the assembly area 24. In one example using FIGS. 15 and 16, first zone may 400 include a field of vision or cover pedestrian aisle 60 where, for example, human operators (not shown) are able to move and supervise operations in the marketplace storage area 20 and assembly area 24. In an alternate example, first zone 400 may alternately, or also, include material aisle 50 where transfer vehicles 40 move as generally described above.

In the FIGS. 15, 16 and 17 examples, detection by sensors 394 of a moving or unauthorized object in the second zone 404 may trigger an alert and/or alter assembly operations in the assembly cell 34 or area 24. In one example, second zone 404 may include a field of vision or cover material aisle 50. In one example, if an unauthorized object or a human operator (not shown) is detected in material aisle 50, automated devices for example the transport vehicles 40, high speed assembly robots 314/314A, and/or automated assembly system 310 may automatically be reduced in movement speed by the control system 326, 616 to prevent a high speed impact with the detected unauthorized object. Alternately, detection of an unauthorized object in second zone 404 may immediately stop all movement and/or operation of controlled automated equipment 40, 314, 314A, 310 in the assembly cell 34C and/or assembly area 24A. In an alternate example, second zone 404 may alternately, or also, include or cover rack aisle 56.

In the FIGS. 15, 16 and 17 examples, detection by sensors 394 of an unauthorized object in the third zone 406 may signal a serious or high level alert and initiate an immediate stoppage of all automated operations in an assembly cell 34C or assembly area 24A until the alert is investigated and resolved/cleared. In one example, third zone 406 may include the material aisle 50, rack aisle 56 and/or area(s) between the rack aisle 56 and assembly path of travel 30 along the y-direction 140. It is understood that the field of vision or area of coverage by sensors 394 may include one or more of the above described aisles or areas, or alternate or additional areas, to suit the particular application and or facility safety requirements, as known by those skilled in the art.

In one example of system 390, sensors 394, 428 may be one or more of laser, ultrasonic, infrared or other sensors operable to detect selected objects, or movement of objects, within a field of vision or coverage area of the sensor 394. Other devices, for example, video cameras or other image capturing devices may be used to detect the presence, or unauthorized movement, of equipment or other objects within the respective zone. In one example, the system 390 and/or sensors 394, 428 can detect and distinguish between authorized equipment or objects, and unauthorized equipment or objects in a respective zone. For example, a sensor 394 having a field of vision covering the material aisle 50 may be operable to distinguish between a transport vehicle 40 which is permissible to move in material aisle 50, from a human operator (not shown) which would not be permissible in the material aisle 50 under normal operations. This may equally be used for rack aisle 56 and automated assembly system 310. Alternate devices (not shown), for example radio frequency identification (RFID) tags or other devices, may be secured to, for example, objects normally permitted to be in a zone which would not trigger or alert an alarm in a respective zone and would not slow or stop operations if detected. For example, movement of containers 44, trays 244, or robots 314, 314A in the rack aisle 56 would not trigger an alert or alarm to slow or stop operations in the assembly cell 34C or assembly area 24A. System 390 may also be used in marketplace storage area 20 in a similar manner. Other systems 390, sensors 394, devices, control systems, and/or operations for use as a vision safety system in combination with system 10 as described, may be used as known by those skilled in the art.

Figure 18:
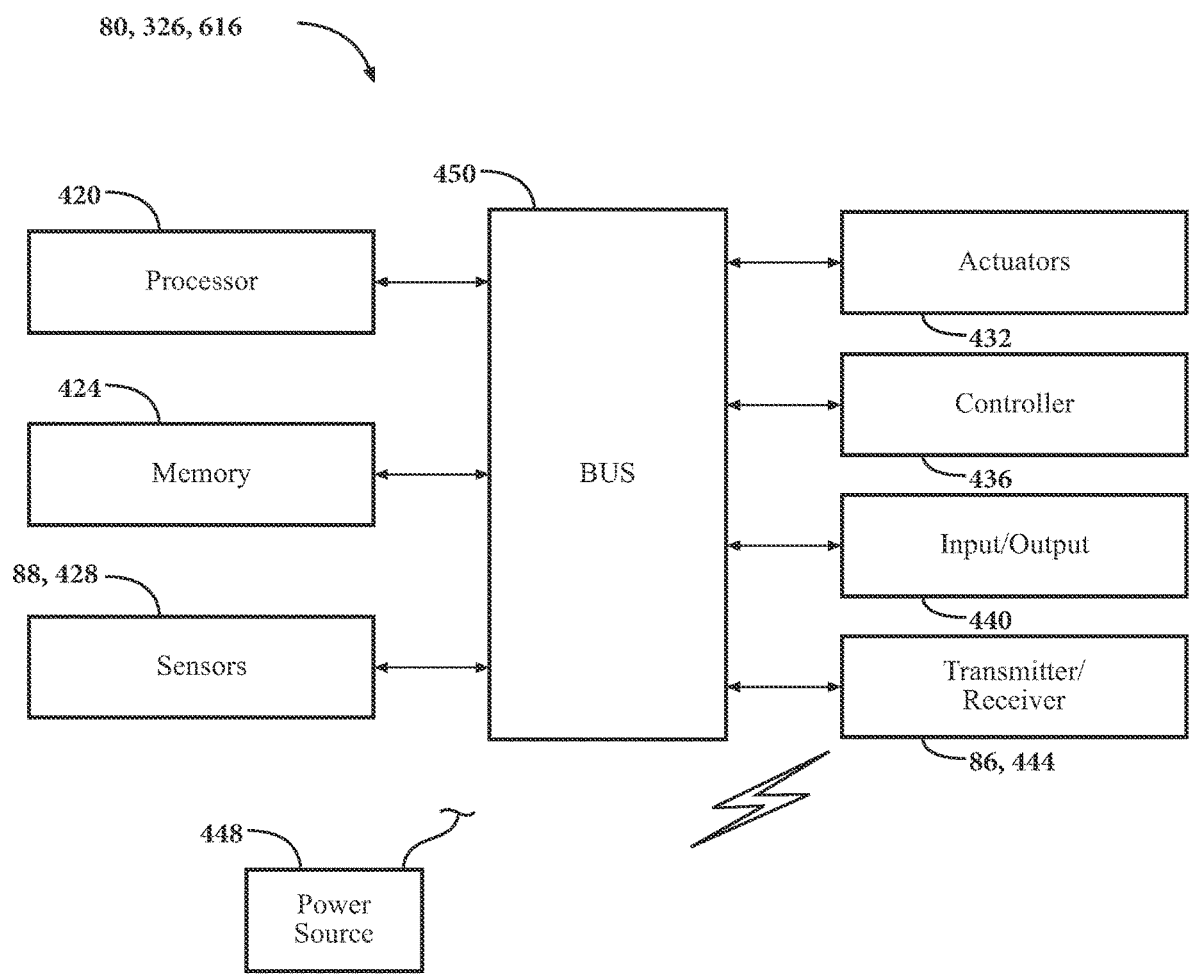
FIG. 18 is a schematic of one example of a control system.

Referring to FIG. 18, an example of a transfer vehicle 40 control system 80, local control system 326 and/or central control system 616 is illustrated (collectively referred to as local or control system 326 unless noted). Control system 326 includes a computing device, or multiple computing devices, working cooperatively. The exemplary control system computing device includes common hardware components, including but not limited to, a central processing unit (CPU) 420, data memory storage device 424, one or more controllers (including but not limited to programmable logic controllers (PLC)) 436, input/output devices 440, transmitter and receiver 444 for sending and receiving hard-wired or wireless data signals, actuators 432 (for example electric motors), and sensors 86, 428. These hardware components are in data signal communication with one another, either through hard wire connections or wireless communication protocols, through a bus 450 or other suitable hardware. Other hardware components, including additional input and output devices 440, to suit the particular application and performance specifications known by those skilled in the art may be used. Examples of input devices include, but not limited to, touch sensitive display devices, keyboards imaging devices and other devices that generate computer interpretable signals in response to user interaction. Examples of output devices include, but not limited to, display screens, speakers, alert lights and other audio or visually perceptible devices. Control system 326 is powered by the power source 406, for example a rechargeable battery or conventional electricity provided by the assembly facility 12.

Exemplary processor 420 can be any type of device that is able to process, calculate or manipulate information, including but not limited to digital information, that is currently known or may be developed in the future. One example of a processor is a conventional central processing unit (CPU).

The exemplary data memory storage device 424 may include devices that store information, including but not limited to digital information, for immediate or future use by the processor 420. Examples of memory storage devices include either or both of random access memory (RAM) or read only memory (ROM) devices. The memory storage device may store information, such as program instructions that can be executed by the processor 420 and data that is stored by and recalled or retrieved by the processor 420. Additionally, portions of the operating system for the computational device and other applications can be stored in the data memory storage device 424. Non-limiting examples of memory storage device 424 include a hard disk drive or a solid state drive. Alternately, portions of the stored information may be stored in the cloud (remote storage devices or data centers) and selectively retrieved through wireless protocols.

In one example of system 10, control system 326 includes a suitable software operating system and preprogrammed software to execute predetermined actions, functions or operations of the system 10 described herein. The operating system and software may be stored in the data memory storage device 424 and processed and executed by the processor 420 through controller 436 and actuators 432.

In one example, system 10, or components thereof, for example transport vehicles 40, may receive operational instructions and commands through data signals wirelessly streamed in real time from the local or central control system 326, 616, or other local or central control systems. Examples of communication networks that may be in use in facility 12 may include, but are not limited to, large area networks (LAN) or a campus area network (CAN). Examples of wireless communication networks, systems and protocols usable with system 10 include wireless routers for communication based on IEEE standard 802.11 (also known as wi-fi). Other wireless communication protocols, for example BLUETOOTH, may be used. Other wired communication systems and components for communication may be based on IEEE standard 802.3 (also known as the Ethernet) may be used in certain applications. Other forms of communication networks, wired and wireless communication protocols, systems and devices known by those skilled in the art may be used.

The above-described autonomous or self-driving mode of operation of transport vehicles 40 may be achieved through use of one or a plurality of sensors 86, 428 onboard device 40A, B, E, for example, omni-directional LIDAR (light imaging, detection and ranging), onboard processing of the received sensor data by the transport vehicle 40, and onboard execution of commands through the onboard control system 80 and actuators 432 to navigate and move the vehicle 40 along a path of travel. Other types and forms of sensors 86, 428, and positional monitoring and navigation systems may be used including, but not limited to, global positioning satellite (GPS) systems, triangular positioning devices, ultrasonic sensors, laser sensor systems, radar, proximity sensors, and/or visual imaging devices or systems known by those skilled in the art. As noted, instructions and commands for movement and guidance of each vehicle 40 may alternately, or in combination, be received by the respective vehicle 40 from a local and/or central control system 326, 616 for execution by the respective vehicle 40 control system 80.

As described above and illustrated, control systems 326 are also in communication with automated equipment in the marketplace storage area 20 and/or assembly area 24. For example, sensors and actuators may be activated and controlled to move or queue containers 44 in the storage rack 162 rack aisle 56, and control and move robots 314, 314A and automated assembly system 310 conveying devices to sequentially move progressively assembled vehicles or at least one product through the assembly areas 24.

Figure 19:
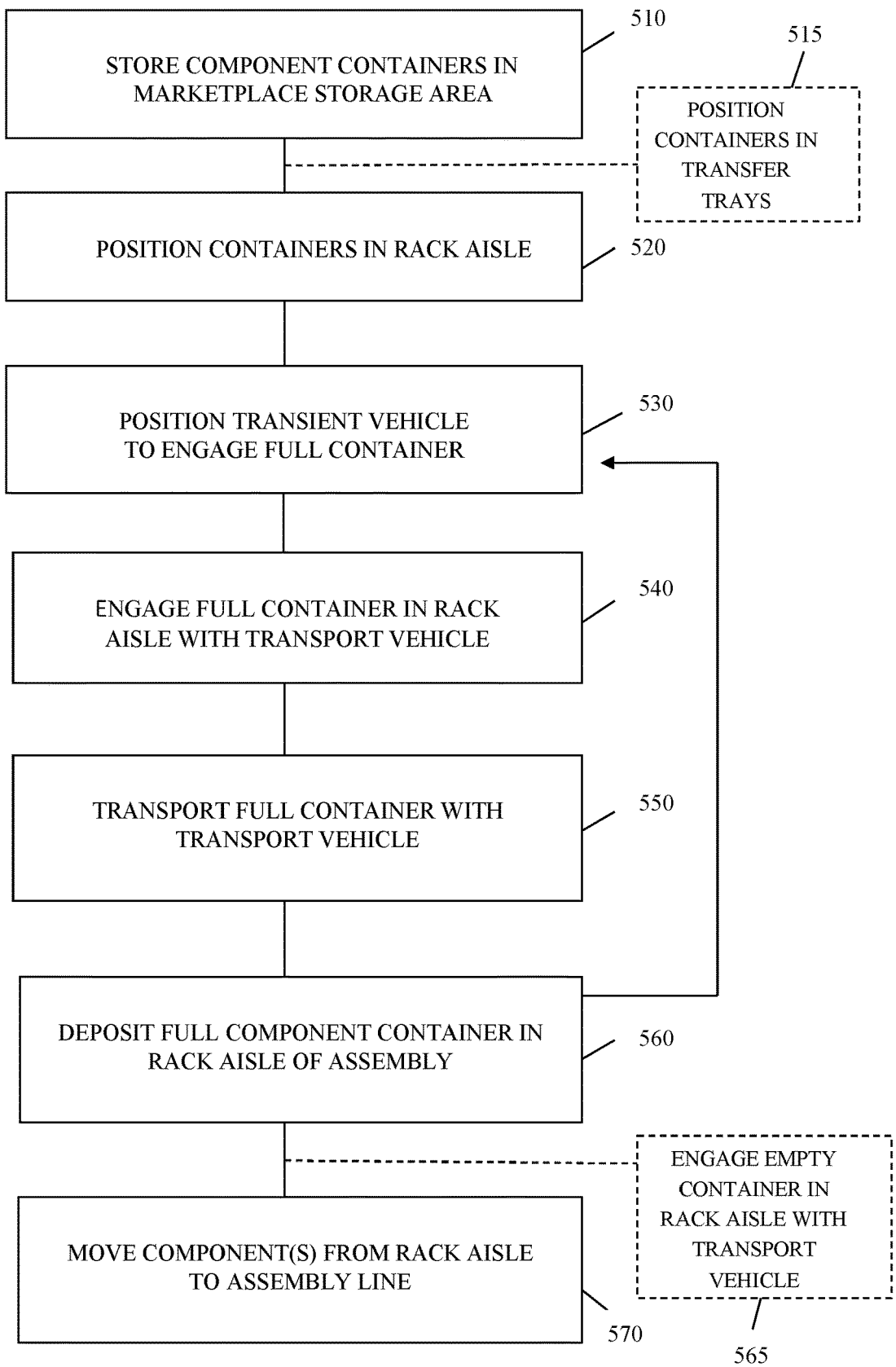
FIG. 19 is a schematic flow chart of one example of a method of the present invention.

Referring to FIG. 19 an example of a method for assembly material logistics 500 is shown. In one example method, step 510 includes storing a plurality of component containers 44 containing at least one component in a marketplace storage area 20. As described above, exemplary marketplace storage area 20 includes large component container area 160, small container component area 166, and consumable assembly materials area 170 to temporarily store and organize the components and associated containers 44 used to assist assembly operations. As described above, component containers may include 44A, 44B, transfer trays 244 and conventional pallets (for the consumable materials) or other devices or structures operable to support and assist transfer of containers or components.

In an alternate and optional step 515, components and/or subassemblies 426 from the small component area 166 may be transferred from containers 44A or 44B to transfer trays 244 as describe above.

In one example step 520, selected component containers 44 are selectively positioned and queued in marketplace storage area 20 in a rack aisle 56 positioned directly adjacent to a material aisle 50 as described above. It is understood that the container can be positioned in a location outside of, or different from, a rack aisle 56 described and illustrated herein.

Exemplary step 530 includes positioning a transport vehicle 40 along the material aisle 50 adjacent to the predetermined rack aisle 56 including the queued component containers 44.

Exemplary step 540 includes engaging selected one of the plurality of full containers 44, 204 by the transport vehicle 40. In one example, the transport vehicle 40 extends a first 110 or second 114 support in a y-direction 140 into the rack aisle 56 to engage and secure onto the vehicle 40 the predetermined, positioned, queued, and aligned full component container 44, 204. In one example where a transport vehicle 40 includes first 110 and second 114 supports, an empty/depleted component container 44, 208 is deposited in the component storage area 20 immediately before or after the transport vehicle 40 engages the full component container 44, 204. As described, use of a vehicle 40 with first 110 and second 114 supports allows the same vehicle 40 to engage a full or empty container, quickly index along the material aisle 50 the x-direction, and disengage and deposit the other of an empty or full container into the storage rack 162 rack aisle 56, or alternately in the assembly area 24 rack aisle 56, as described above. In an alternate example where transport vehicles 40 include only a first support 110, a second or companion transport vehicle 40 may engage or deposit the other of the full or empty container in the appropriate rack aisle 56.

Exemplary step 550 includes transporting the engaged full component container 44, 204 from the marketplace storage area 20 to the assembly area 24 (or alternately an empty container 44, 214 from the assembly area 24 to the marketplace storage area 20). In one example, the transport vehicles 40 move only along the material aisle 50 in an x-direction 64 as described above.

Exemplary step 560 includes depositing the full component container in the rack aisle 56 of the assembly area 24 as described above (or alternately an empty container in in the rack aisle 56 of the storage rack 162). In one example, the transport device 40 extends a first or second support in a y-direction 140 into the rack aisle 56.

In an exemplary and optional step 565, wherein the transport vehicle 40 includes first 110 and second 114 supports, the transport vehicle 40 may also pickup/engage an empty/depleted component container 44, 218 while positioned in the assembly area 24 prior to returning to the marketplace storage area 20 to engage another full component container 44, 204 in the manner generally described above. In an alternate example where transport vehicles 40 include only a first support 110, a second or companion transport vehicle 40 may engage an empty container 44, 214 in the assembly area 24 rack aisle 56, coordinatingly transport the empty container to the marketplace storage area 20, and deposit the empty container in the storage rack 162 rack aisle 56 as described above.

Although method 500 is described as engaging, transporting and disengaging full containers from the storage area 20 rack 162 to the assembly area 24, it is understood that the method 500 is equally used to engage, transfer and deposit full containers from the storage areas 166 and/or 170 to the assembly area 24 in a similar manner. It is further understood that method 500 is equally used to engage, transfer and deposit empty containers from the assembly area 24 to the marketplace storage area 20, including each of the areas 160, 166 and 170, in a similar manner.

In illustrated exemplary step 570 in FIG. 19, and as seen and described for FIG. 16, components are removed from the container 44A, 44B or trays 244 positioned in the assembly area 24 rack aisle 56 and either transferred to trays 244A positioned directly adjacent to the assembly path of travel 30, or directly into the automated assembly system 310 and/or assembly path of travel 30 for use in assembly operations as generally described above. Where components are first transferred to trays 244A, assembly robots 314 selectively engage the components positioned on the trays 244A and transfer them into the automated assembly system 310 and/or assembly path of travel 30 for use. As described above, one or more, or a plurality of robots 314A, 314 may be used to transfer components from the rack aisle 56 into the automated assembly system 310 and/or assembly path of travel 30 for use.

Exemplary method 500 may include additional steps, removal of steps, and/or steps in a different sequence or order than as described and illustrated to effect the devices and methods of system 10 described herein, as known by those skilled in the art.

Figure 20:
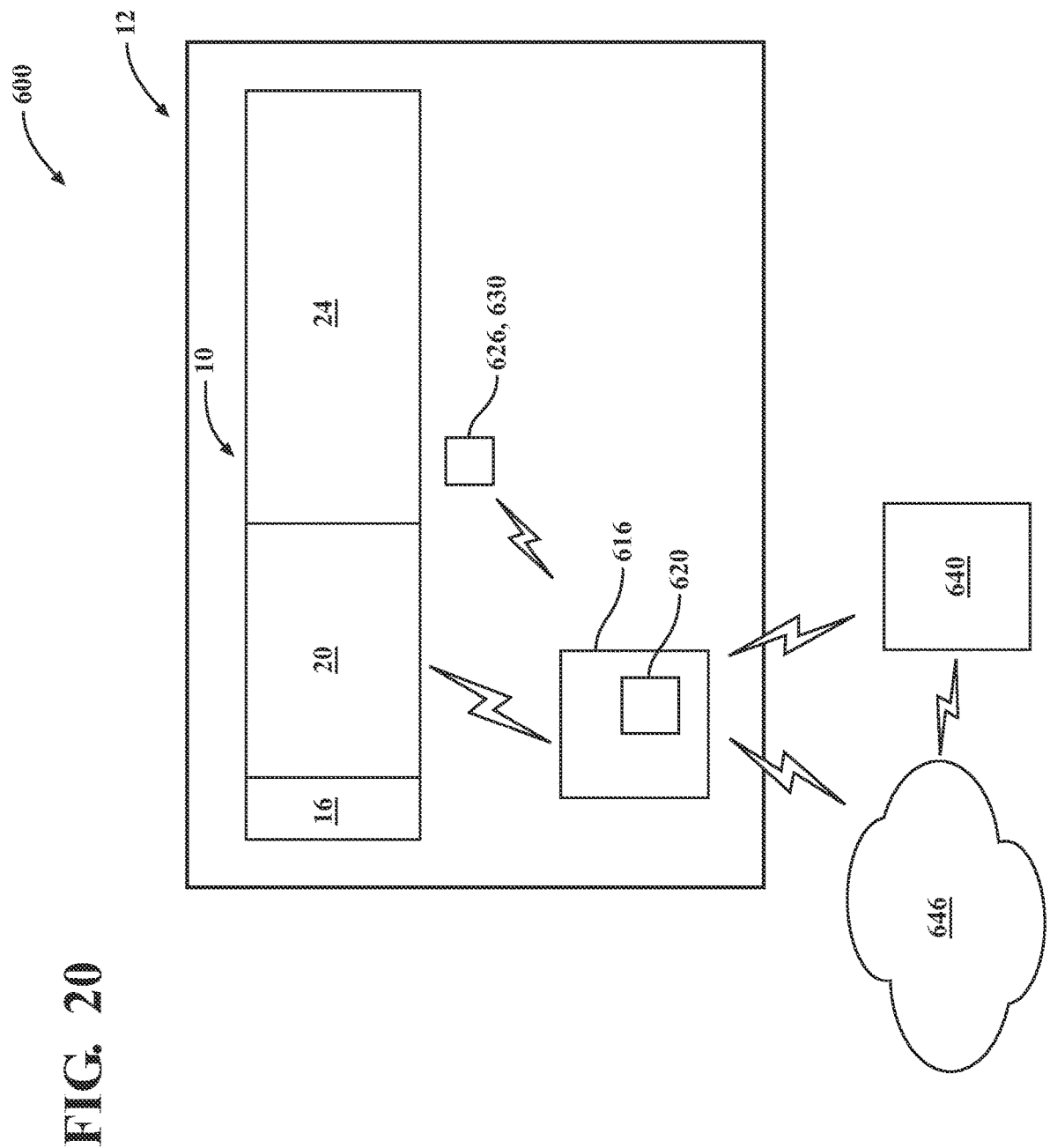
FIG. 20 is a schematic diagram of an example of an assembly logistics control and monitoring system.
Figure 21:
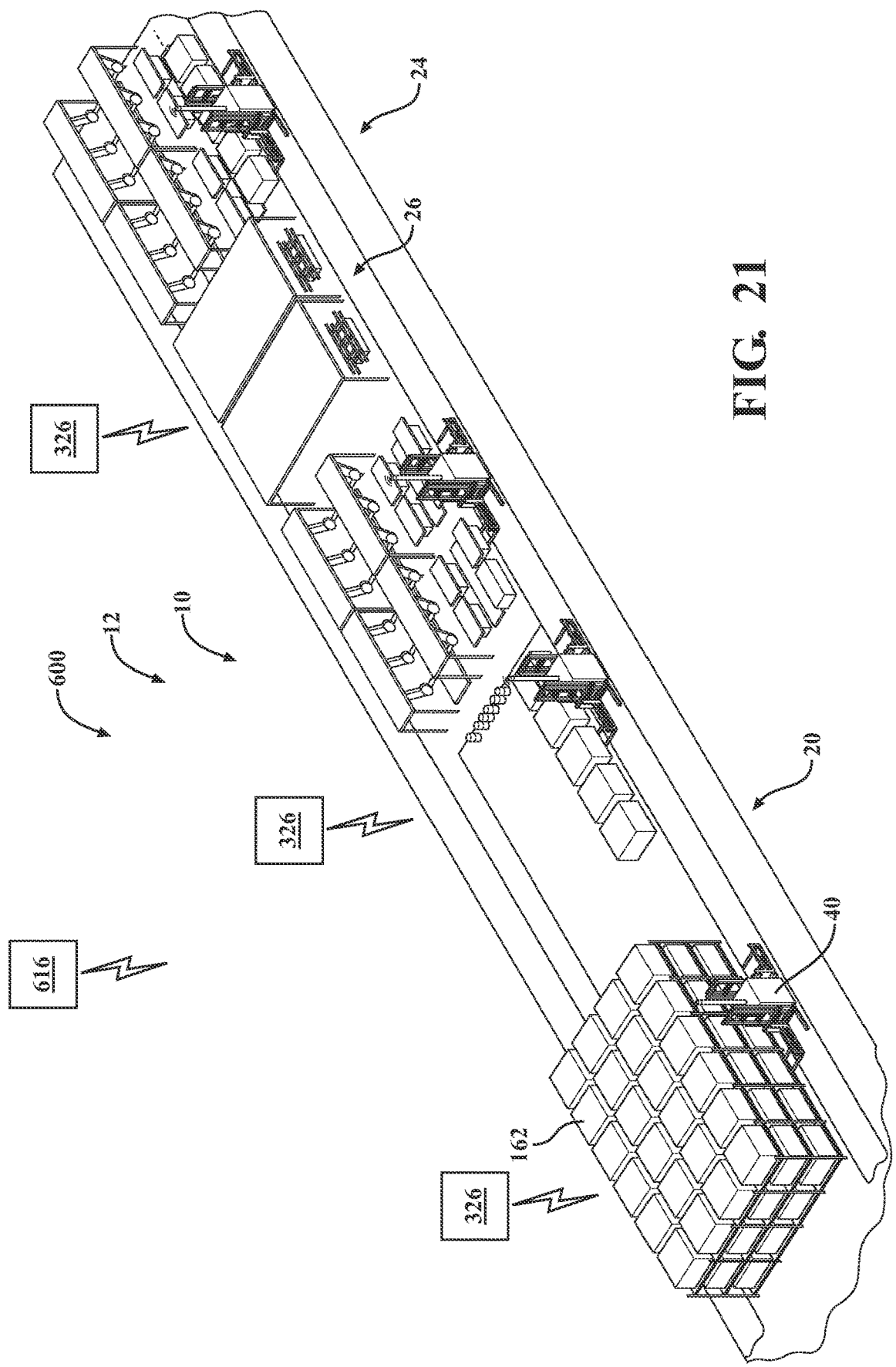
FIG. 21 is a left perspective view of an example of implementation of the assembly logistics control and monitoring system of FIG. 20.

Referring to FIGS. 20 and 21, an example of an assembly logistics monitoring system and methods 600 useful in system and methods 10 is shown. In the example system and methods 600, the facility 12 system 10 logistics devices and operations described above, including the assembly operations in the assembly area 24, are completely, or substantially, automated.

Through the use of a plurality of sensors 428 and monitoring devices described above and summarily described below, the location and movement of the component containers 44, the storage and/or inventory of components in the storage area 20, and/or assembly operations in area 24, are continuously, or periodically, monitored and data transmitted to a central control center described below. Through monitoring, collection, and analysis of the logistics data, real time visual and analytical models of the facility 12 and system 10 can be viewed and monitored to detect whether the system 10, and all subsystems, for example marketplace storage area 20, transfer vehicles 40, assembly area 24, are operating within predetermined parameters. The system and methods 600 may be implemented in one or more, or every aspect, of the above-described logistics operations from entrance of components in the loading dock 16, through storage and movement in the marketplace storage area 20, transfers between storage area 20 and assembly area 24, and assembly operations in assembly area 24.

Referring to FIG. 20, an example of facility 12 includes system 10 described above as including a loading dock 16, marketplace storage area 20 and an assembly area 24. Exemplary assembly area 24 is described above including one or more, or a plurality of, assembly lines 26. In one example of system 600, facility 12 includes a central control center 616 including a logistics and assembly monitoring and simulation system and devices 620. System 620 may include commercially available product manufacture and/or assembly simulation software programs that allow detailed monitoring and analysis of automated industrial equipment and processes.

As shown in FIG. 21, each marketplace storage area 20 and assembly area 24 (only one assembly line 26 shown) may include one or more local control and monitoring devices 326 (three shown). The components, hardware, operating systems and software are described above for control system 80, 326 and shown in FIG. 18. The local control device 326 is in data signal communication, wireless and/or hardwire as described above, with a plurality of sensors and monitoring devices (not shown) connected to, and/or monitoring, automated devices described above, for example sensors and actuators in the storage rack 162, transport vehicles 40, robots 314, 314A, and/or automated assembly system 310. It is understood local control device 326 may be in communication with additional or alternate sensored or automated devices in system 10.

Examples of sensors 428 and monitoring devices may include electronic, physical, positional, visual imaging cameras and video devices, and other sensors and devices to detect and/or monitor predetermined conditions of the automated devices and transmit signal data to the local 326 or central control center 616 for analysis and monitoring. Other sensor and monitoring devices to detect position and physical movement, time, and/or other metrics to suit the particular automated equipment and assembly process known by those skilled in the art may be used.

In exemplary system and methods 600, the transferred logistics signal data collected by the sensors and/or local control devices 326 are transmitted to central control center 616. The control center 616 and monitoring system 620 may include one or more devices, hardware, operating systems and software described and illustrated in FIG. 18. An example of the monitoring or simulation system 620 may include computers and visual monitors for visually displaying one or more aspects of the logistics operations and data received from the operation of system 10. In the example system 600, the logistics and assembly operations of facility 12 can be visually monitored and analyzed, and calculations made, to monitor whether the logistics and/or assembly operations are performing within predetermined parameters stored in memory devices 424 (schematically illustrated in FIG. 18). In one example, a virtual digital model of one or more operations of system 10, or the entire facility 12, can be generated and/or simulated for real time monitoring of the processes and equipment against predetermined efficiency and performance standards/targets established for system 10.

In one example of system 600 shown in FIG. 20, one or more of the monitoring and/or simulation activities described above in control center 616 may be conducted in an off-site/distant facility 640. Further, the local or central control devices 326 and/or 616 may be in communication with off-site/distant cloud data centers 646 in communication with off-site facility 640. Other computing centers and communication devices and systems to suit the application known by those skilled in the art may be used.

It is understood that system and method 600 may include additional or alternate devices, and additional or alternate method steps, or steps in a different order or sequence in time, to suit the particular application and performance requirements as known by those skilled in the art.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An assembly material logistics system comprising:
    a marketplace component storage area operable to temporarily store a plurality of component containers each supporting at least one component, the storage area having a rack aisle extending in a x-direction;
    an assembly area positioned downstream of the storage area comprising:
        at least one assembly line operable to assemble at least one product including the at least one component; and
        a rack aisle extending in the x-direction positioned downstream of the storage area rack aisle along the x-direction and in alignment with the storage area rack aisle;
    a material aisle positioned directly adjacent to and parallel with the aligned storage area rack aisle and the assembly area rack aisle; and
    a plurality of transfer vehicles selectively and reciprocally movable along the material aisle between the storage area and the assembly area, the plurality of transfer vehicles each independently operable to selectively engage at least one of a full or an empty component container in the storage area rack aisle or the assembly area rack aisle, transfer the engaged at least one of the full or empty component containers between the storage area and the assembly area, and selectively disengage the at least one of the full or empty component containers in the storage area rack aisle or the assembly area rack aisle to support assembly of the at least one product.

2. The system of claim 1 wherein the aligned storage area rack aisle and the assembly area rack aisle comprise straight line alignment along the x-direction.

3. The system of claim 1 wherein the component storage area further comprises:
    a large component container storage area having a component storage rack; and
    a small component container storage area positioned adjacent to the large component storage area.

4. The system of claim 3 wherein the component storage rack comprises a plurality of bays defining a presentation row positioned in the storage area rack aisle including the plurality of bays, the storage rack operable to at least one of position full component containers in the presentation row of the storage area rack aisle for selected engagement by the plurality of transfer vehicles or receive empty component containers in the presentation row of the storage area rack aisle disengaged by the plurality of transfer vehicles.

5. The system of claim 4 wherein the component storage rack further comprises a plurality of powered actuators positioned in the plurality of bays operable to at least one of selectively move full component containers positioned in a respective bay toward the presentation row or selectively move empty component containers positioned in a respective bay toward an exit row.

6. The system of claim 3, wherein the storage area rack aisle in the small container storage area further comprises a plurality of component container pickup locations extending along the x-direction in the storage area rack aisle in the small container storage area and aligned with the rack aisle in the assembly area, the plurality of component containers further comprise a plurality of transfer trays, each transfer tray selectively positioned in one of the plurality of pickup locations in the storage area rack aisle in the small container storage area, the transfer trays are operable to position and support the at least one component in a predetermined position relative to the transfer tray, the transfer tray and the supported at least one component defining the full component container.

7. The system of claim 6 wherein each of the plurality of transfer trays further comprise:
    a base support surface having a precision mounting grid; and
    at least one holding fixture mounted in the mounting grid, the holding fixture operable support the at least one component in a precision location relative to the transfer tray.

8. The system of claim 3 wherein the component storage area further comprises a consumable materials storage area positioned adjacent to at least one of the large component container storage area or the small component container storage area, the consumable materials storage area operable to temporarily store and organize consumable materials to support assembly of the at least one product, the consumable material storage area further comprises the storage area rack aisle extending along the x-direction and aligned with the rack aisle in the assembly area.

9. The system of claim 1 wherein the assembly area at least one assembly line further comprises:
    a first assembly cell extending in the x-direction along the assembly line; and
    a second assembly cell in assembly communication with the first assembly cell, each of the first and the second assembly cell including an assembly path of travel and a portion of the assembly area rack aisle aligned with the storage area rack aisle, each assembly cell rack aisle positioned from the assembly path of travel in a y-direction, the respective assembly cell rack aisle portion operable to selectively receive full component containers from the plurality of transfer vehicles including predetermined components to support an assembly operation in the respective first or second assembly cell.

10. The system of claim 9 wherein at least one of the first or the second assembly cell further comprises a programmable robot positioned between the assembly cell rack aisle portion and the assembly path of travel, the robot operable to selectively engage the predetermined components in the rack aisle portion and transfer the engaged component to the respective assembly cell assembly line path of travel to support the assembly of the at least one product.

11. The system of claim 9 where the assembly area further comprises a consumable material station positioned adjacent to at least one of the first or the second assembly cell, the consumable material station having a portion of the assembly area rack aisle operable to receive full component containers of consumable material from the plurality of transfer vehicles to support assembly operation in the at least first assembly cell or the second assembly cell.

12. The system of claim 11 wherein the consumable material station is positioned between the first assembly cell and the second assembly cell.

13. The system of claim 1 wherein at least one of the transfer vehicles further comprises:
a first support; and
a second support positioned on opposing ends of a vehicle body, each of the first and second supports operable to independently and selectively engage, support and disengage a component container.

14. The system of claim 13 wherein the transfer vehicle is autonomous in operation to selectively move along the material aisle and selectively engage and disengage component containers positioned in the storage area and the assembly area.

15. The system of claim 1 further comprising a pedestrian aisle extending in the x-direction, the pedestrian aisle positioned directly adjacent to and parallel with the material aisle.

16. The system of claim 1 wherein the assembly area at least one assembly line comprises a plurality of assembly lines, each of the plurality of assembly lines comprises a dedicated assembly line rack aisle, wherein the system further comprises for each respective assembly line:
a dedicated marketplace component storage area having the storage area rack aisle aligned with the respective assembly line dedicated rack aisle positioned downstream of the dedicated storage area rack aisle along the x-direction;
a dedicated material aisle positioned directly adjacent to and parallel with the assembly area rack aisle and the aligned dedicated storage area rack aisle; and
at least one of the plurality of transfer vehicles reciprocally movable along the dedicated material aisle between the respective dedicated component storage area and the respective assembly line.

17. The system of claim 16, wherein the assembly area rack aisle is positioned in straight line alignment with the storage area rack aisle along the x-direction.

18. An assembly material logistics system comprising:
a marketplace component storage area operable to temporarily store a plurality of component containers each supporting at least one component, the storage area having a rack aisle extending in an x-direction, the storage area further comprising:
a large component container storage area having a component storage rack including a presentation row positioned in the rack aisle;
a small component container storage area positioned adjacent to the large component container storage area including a portion of the rack aisle, the plurality of component containers positioned in the small component container storage area comprising a plurality of transfer trays operable to support the at least one component;
a consumables storage area positioned adjacent to at least one of the large component storage area or the small component storage area and including a portion of the rack aisle;
an assembly area comprising:
at least one assembly line having a first assembly cell and a second assembly cell in communication with the first assembly cell along an assembly path of travel, the assembly line operable to assemble at least one product including the at least one component;
a consumable material station positioned adjacent to at least one of the first assembly cell or the second assembly cell;
a rack aisle extending through the assembly area in the x-direction and positioned downstream of the storage area rack aisle along the x-direction and in alignment with the storage area rack aisle;
a material aisle positioned directly adjacent to and parallel with the aligned storage area rack aisle and the assembly area rack aisle; and
a plurality of transfer vehicles selectively and reciprocally movable along the material aisle between the storage area and the assembly area, the plurality of transfer vehicles each independently operable to selectively engage at least one of a full or an empty component container or transfer tray in the storage area rack aisle or the assembly area rack aisle, transfer the engaged at least one of the full or empty component containers or transfer trays between the storage area and the assembly area, and selectively disengage the at least one of the full or empty component containers or transfer trays in the storage area rack aisle or the assembly area rack aisle to support assembly of the at least one product.

19. A method for assembly material logistics comprising:
storing a plurality of component containers in a marketplace storage area positioned upstream of an assembly area operable to assemble at least one product, each component container supporting at least one component defining a full component container;
selectively positioning predetermined full component containers in a storage area rack aisle extending in a x-direction;
positioning one of a plurality of transfer vehicles in a material aisle positioned directly adjacent to and parallel with the storage area rack aisle;
selectively engaging by the transfer vehicle a predetermined one of the plurality of full component containers from the storage area rack aisle and removing the full component container from the storage area rack aisle;
transferring by the transfer vehicle the engaged full component container along the material aisle downstream to the assembly area;
selectively engaging by one of the plurality of transfer vehicles an empty component container positioned in an assembly area rack aisle and removing the empty component container from the assembly area rack aisle, the assembly area rack aisle positioned downstream of the storage area rack aisle along the x-direction and aligned with the storage area rack aisle; and
depositing by the transfer vehicle the engaged and transferred full component container into the assembly area rack aisle to support assembly of the at least one product.

20. The method of claim 19 further comprising the steps of:
- transferring by the transfer vehicle the engaged empty component container from the assembly area to the storage area; and
- depositing by the transfer vehicle the engaged and transferred empty component container into the storage area rack aisle.

21. The method of claim 20 wherein the transfer vehicle comprises a first support and a second support positioned on an opposing side of a body along the x-direction relative to the first support, the one of the plurality of transfer vehicles removing the empty container from the assembly area rack aisle comprises the transfer vehicle that engaged and transferred the full component container from the storage area to the assembly area, the transfer vehicle remaining in engagement with the full component container during the engagement and removal of the empty container from the assembly area rack aisle.

22. The method of claim 19, wherein the storage area rack aisle is positioned in straight line alignment along the x-direction with the assembly area rack aisle.

23. The method of claim 19, wherein the depositing of the engaged and transferred full component container into the assembly area rack aisle further comprises depositing the full component container in the position in the assembly area rack aisle where the empty container was removed.

* * * * *